United States Patent
Auyeung

(10) Patent No.: US 8,199,814 B2
(45) Date of Patent: Jun. 12, 2012

(54) ESTIMATION OF I FRAME AVERAGE RATE QUANTIZATION PARAMETER (QP) IN A GROUP OF PICTURES (GOP)

(75) Inventor: Cheung Auyeung, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1036 days.

(21) Appl. No.: 12/103,470

(22) Filed: Apr. 15, 2008

(65) Prior Publication Data

US 2009/0257488 A1    Oct. 15, 2009

(51) Int. Cl.
*H04N 7/12* (2006.01)
(52) U.S. Cl. ......... 375/240.03; 375/240.16; 375/240.15; 375/240.01; 375/240.24; 375/240.12
(58) Field of Classification Search ............. 375/240.24, 375/240.01, 240.12, 240.15, 240.16
See application file for complete search history.

(56) References Cited

U.S. PATENT DOCUMENTS

| | | | |
|---|---|---|---|
| 5,650,860 A * | 7/1997 | Uz ................................. | 382/253 |
| 6,665,442 B2 * | 12/2003 | Sekiguchi et al. ............ | 382/224 |
| 7,027,510 B2 | 4/2006 | Auyeung | |
| 7,953,286 B2 * | 5/2011 | Chiang et al. ................. | 382/254 |
| 2006/0209948 A1 | 9/2006 | Bialkowski et al. | |
| 2006/0251330 A1 | 11/2006 | Toth et al. | |
| 2007/0009027 A1 | 1/2007 | Zhu et al. | |

FOREIGN PATENT DOCUMENTS

EP    1727370 A1    11/2006

OTHER PUBLICATIONS

Z. Lei et al. Accurate Bit Allocation and Rate Control for DCT Domain Video Transcoding. Proceedings of the 2002 IEEE Canadian Conference on Electrical & Computer Engineering, Mar. 2002.
S-C. Chang et al. A Novel Rate Predictor Based on Quantized DCT Indices and its Rate Control Mechanism (Abstract). Signal Processing: Image Communication, vol. 18, No. 6, Jul. 2003, pp. 427-441.
S. Mallat et al. Analysis of low bit rate image transform coding. IEEE Trans. on Signal Processing, vol. 46, No. 4, pp. 1027-1042 (1998).

(Continued)

*Primary Examiner* — Jay Patel
*Assistant Examiner* — Geepy Pe
(74) *Attorney, Agent, or Firm* — John P. O'Banion

(57) ABSTRACT

Rate-QP estimation for an I picture is disclosed which involves the steps of: providing an input group of pictures (GOP); selecting an input I picture within the GOP; and outputting, to a computer readable medium, a bit rate corrected Rate-QP, R(QP), for the input I picture. The outputting step may involve calculating intra luma and chroma Rate-QP estimates from corresponding intra luma and chroma histograms; offsetting the intra chroma Rate-QP estimate to form an offset intra chroma estimate; and setting a bit rate corrected Rate-QP for the input I picture to a corrected sum of the previous estimates. The histograms are formed with estimates of intra prediction coefficients, where an intra/non-intra mode is selected that results in a lowest SATD for each macroblock in the GOP. The methods may be implemented into a computer program, possibly resident in an advanced video encoder.

22 Claims, 21 Drawing Sheets

OTHER PUBLICATIONS

S. Milani et al. A rate control algorithm for the H.264 encoder. IEEE Trans. on Circuits and Systems for Video Technology, vol. 18, No. 2, Feb. 2008, pp. 257-262.

Z. He et al. Low-Delay Rate Control for DCT Video Coding via p-Domain Source Modeling. IEEE Trans. on Circuits and Systems for Video Technology, vol. 11, No. 8, Aug. 2001, pp. 928-940.

Z. He et al. A unified rate-distortion analysis framework for transform coding. IEEE Trans. on Circuits and Systems for Video Technology, vol. 11, No. 12, Dec. 2001, pp. 1221-1236.

I. Richardson. Vcodex White Paper: An overview of H.264 Advanced Video Coding, Mar. 2007.

I. Richardson. www.vcodex.com H.264 / MPEG-4 Part 10 White Paper (Intra Prediction), dated Apr. 30, 2003.

I. Richardson. www.vcodex.com H.264 / MPEG-4 Part 10 White Paper (Overview), dated Jul. 10, 2002.

Liang et al. MPEG-4 to H.264/AVC Transcoding, IWCMC '07, Aug. 12-16, 2007, pp. 689-693.

Yu et al. A Frequency Domain Approach to Intra Mode Selection in H.264/AVC, Proc. of 13th European Signal Processing Conference (EUSIPCO) '05, Antalya, Turkey, Sep. 2005.

Tsukuba et al., H.264 Fast Intra-Prediction Mode Decision Based on Frequency Characteristic, Proc. of the 13 European Signal Processing Conference (EUSIPCO) '05, Antalya, Turkey, Sep. 2005.

Kim et al., Fast H.264 Intra-Prediction Mode Selection Using Joint Spatial and Transform Domain Features, J. Visual Comm. and Image Representation, vol. 17, No. 2, pp. 291-310 (2006), available online Jul. 1, 2005.

Related U.S. Appl. No. 12/103,482—Office Action dated Sep. 14, 2011 (pp. 1-14), with claims (pp. 15-21).

* cited by examiner

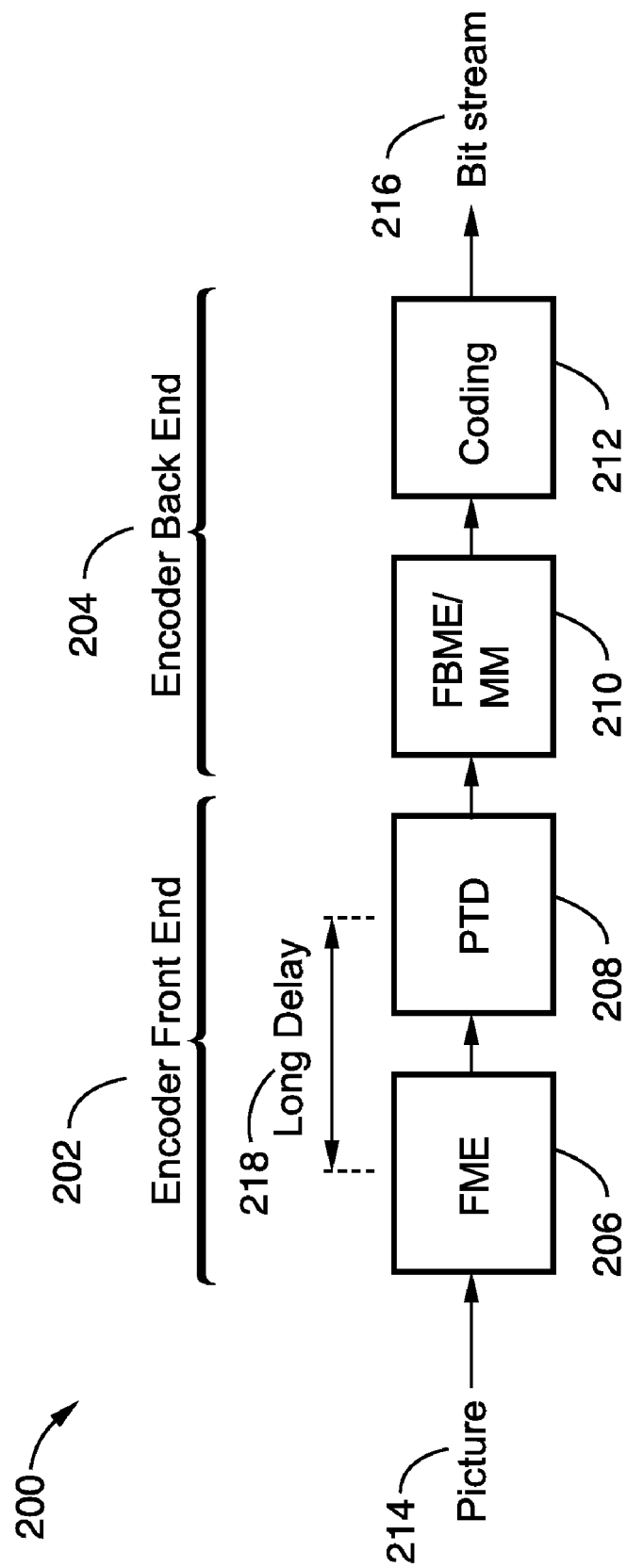

ESTIMATION OF I FRAME AVERAGE RATE QUANTIZATION PARAMETER (QP) IN A GROUP OF PICTURES (GOP)

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to video encoding, and more particularly to intra mode decisions within advanced video encoding (such as H.264/AVC or MPEG 4 Part 10) standards.

2. Description of Related Art

H.264/AVC, alternatively known by MPEG 4 Part 10 and several other monikers, is representative of improved data compression algorithms. This improved data compression, however, comes at the price of greatly increased computational requirements during the encoding processing phase.

Additional background information can be found in the following publications which are incorporated herein by reference in their entirety:

[1] Stèphane Mallat and Frederic Falzon, "Analysis of Low Bit Rate Image Transform Coding," IEEE Trans on Signal Processing, vol. 46, no. 4, pp. 1027-1042, April 1998.

[2] Zhihai He and Sanjit K. Mitra, "A unified rate-distortion analysis framework for transform coding," IEEE Trans on Circuits and Systems for Video Technology, vol. 11, no. 12, pp. 1221-1236, December 2001.

BRIEF SUMMARY OF THE INVENTION

One aspect of the invention is a method of Rate-QP estimation for an I picture, comprising: (a) providing an input group of pictures (GOP); (b) selecting an input I picture within the input group of pictures; and (C) outputting, to a computer readable medium, a bit rate corrected Rate-QP, R(QP), for the input I picture.

Here, the outputting step may comprise: (a) calculating an intra luma (Y) Rate-QP estimate from an intra luma (Y) histogram; (b) calculating an intra chroma (C) Rate-QP estimate from an intra chroma (C) histogram; (c) offsetting the intra chroma (C) Rate-QP estimate to form an offset intra chroma (C) estimate; and (d) setting a Rate-QP for the input I picture to a sum of: (i) the intra luma (Y) Rate-QP estimate; and (ii) the offset intra chroma (C) Rate-QP estimate.

The step of outputting the bit rate corrected Rate-QP may comprise: (a) correcting the Rate-QP of the input I picture to produce the bit rate corrected Rate-QP, R(QP). The method of correcting the bit rate corrected Rate-QP step may comprise: (a) partitioning a set of ordered pairs of (QP, Rate-QP) into a plurality of correction regions; (b) applying mapping functions for QP values in each of the correction regions to produce the bit rate corrected Rate-QP, R(QP).

In particular, the plurality of correction regions may comprise: (a) a high bit rate correction region; (b) a medium bit rate correction region; and (c) a low bit rate correction region. Within these correction regions, one may apply a linear interpolation for QP values in the high bit rate correction region, a medium bit rate correction for QP values in the medium bit rate correction region, and a low bit rate correction for QP values in the low bit rate correction region. The low bit rate correction may be based on entropic or other considerations presented in this invention. Ideally, these bit rate correction functional mappings are continuous in output values and first derivatives in a region of overlap, so as to result in smooth corrections.

The intra luma (Y) histogram, and the intra chroma (C) histogram described above are accumulated, for every macroblock in the group of pictures, in steps comprising: (a) forming an estimate of a set of intra prediction coefficients; (b) for each macroblock, separating the set of intra prediction coefficients into an output accumulated intra luma (Y) histogram and an accumulated intra chroma (C) histogram.

The selection of the intra mode may comprise: (a) selecting the intra mode that has a lowest Sum of Absolute Transformed Differences (SATD) among intra modes using a set of inputs $[x]$, $H_{pos}$, $V_{pos}$, $\vec{h}$, and $\vec{v}$; (b) wherein $[x]$ is a 4×4 block of pixels within the input I picture and $$[x] \equiv \begin{bmatrix} x_{0,0} & x_{0,1} & x_{0,2} & x_{0,3} \\ x_{1,0} & x_{1,1} & x_{1,2} & x_{1,3} \\ x_{2,0} & x_{2,1} & x_{2,2} & x_{2,3} \\ x_{3,0} & x_{3,1} & x_{3,2} & x_{3,3} \end{bmatrix};$$

(c) wherein $H_{pos}$ is a horizontal pixel position of the 4×4 block within the image; (d) wherein $V_{pos}$ is a vertical pixel position of the 4×4 block within the image; (e) wherein $\vec{h}$ is a vector immediately left of the 4×4 block $[x]$, defined as $\vec{h} \equiv (x_{0,-1}, x_{1,-1}, x_{2,-1}, x_{3,-1})^T$ relative to the indexing of the elements of $[x]$; (f) wherein $\vec{v}$ is a vector immediately above the 4×4 block $[x]$, defined as $\vec{v} \equiv (x_{-1,0}, x_{-1,1}, x_{-1,2}, x_{-1,3})^T$ relative to the indexing of the elements of $[x]$; and (g) wherein the lowest SATD intra mode is determined among a group comprising: (i) a horizontal intra mode; (ii) a vertical intra mode; and (iii) a steady state (DC) intra mode.

The process of selecting the lowest SATD intra mode step may comprise: (a) calculating a horizontal predictor $\vec{H} \equiv (H_0, H_1, H_2, H_3)^T$, a vertical predictor $\vec{V} \equiv (V_0, V_1, V_2, V_3)$, and a steady state (DC) predictor D; (b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and (c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

The method of calculating the horizontal predictor $\vec{H}$, the vertical predictor $\vec{V}$, and the steady state (DC) predictor D may comprise:

(a) if $H_{pos} \neq 0$ and $V_{pos} \neq 0$ then:

(i) setting $\vec{H} \equiv (H_0, H_1, H_2, H_3)^T = [NDCT_4] \vec{h}$ where $\vec{h} \equiv (h_0, h_1, h_2, h_3)^T \equiv (x_{0,-1}, x_{1,-1}, x_{2,-1}, x_{3,-1})^T$;

(ii) setting $\vec{V} \equiv (V_0, V_1, V_2, V_3)^T = [NDCT_4] \vec{v}$ where $\vec{v} \equiv (v_0, v_1, v_2, v_3) \equiv (x_{-1,0}, x_{-1,1}, x_{-1,2}, x_{-1,3})^T$;

(iii) setting $D=(H_0+V_0)/2$;

(b) if $H_{pos}=0$ and $V_{pos}\neq 0$ then:

(i) setting $\vec{H}=(2^{15}-1,0,0,0)^T$;

(ii) setting $\vec{V}\equiv(V_0,V_1,V_2,V_3)^T=[NDCT_4]\vec{v}$ where $\vec{v}\equiv(v_0,v_1,v_2,v_3)\equiv(x_{-1,0},x_{-1,1},x_{-1,2},x_{-1,3})^T$;

(iii) setting $D=V_0$;

(c) if $H_{pos}\neq 0$ and $V_{pos}=0$ then:

(i) setting where $\vec{h}\equiv(h_0,h_1,h_2,h_3)^T\equiv(x_{0,-1},x_{1,-1},x_{2,-1},x_{3,-1})^T$;

(ii) setting $\vec{V}=(2^{15}-1,0,0,0)^T$;

(iii) setting $D=H_0$; and (d) if $H_{pos}=0$ and $V_{pos}=0$ then:

(i) setting $\vec{H}=(2^{15}-1,0,0,0)^T$;

(ii) setting $\vec{V}=(2^{15}-1,0,0,0)^T$; and (iii) setting $D=128\times 16$.

The method of calculating the horizontal cost precursor $C_{hs}$ and the vertical cost precursor $C_{vs}$ may comprise:

(a) calculating the values $X_{i,0}$, $X_{0,i}$ for $i\in 0, 1, 2, 3$ using the relationships $$\begin{bmatrix} X_{0,0} & X_{0,1} & X_{0,2} & X_{0,3} \\ X_{1,0} & X_{1,1} & X_{1,2} & X_{1,3} \\ X_{2,0} & X_{2,1} & X_{2,2} & X_{2,3} \\ X_{3,0} & X_{3,1} & X_{3,2} & X_{3,3} \end{bmatrix} = [NDCT_{4\times 4}]([x]);$$

(b) calculating the horizontal cost precursor $$C_{hs} = \sum_{i=1}^{3} |X_{i,0}|;$$

and (c) calculating the vertical cost precursor $$C_{vs} = \sum_{j=1}^{3} |X_{0,j}|.$$

The method of calculating the horizontal intra mode cost $C_H$ may comprise calculating $$C_H = \sum_{i=0}^{3} |H_i - X_{i,0}| + C_{vs}.$$

The method of calculating the vertical intra mode cost $C_V$ may comprise calculating $$C_V = \sum_{j=0}^{3} |V_j - X_{0,j}| + C_{hs}.$$

The method of calculating the steady state (DC) intra mode cost $C_D$ may comprise calculating $C_D = |D - X_{0,0}| + C_{hs} + C_{vs}$.

The lowest SATD intra mode may be selected with a lowest associated intra mode cost among the group consisting of: the horizontal intra mode cost $C_H$, the vertical intra mode cost $C_V$, and the steady state (DC) intra mode cost $C_D$.

In another aspect of the invention, a computer readable medium comprising a programming executable capable of performing on a computer the various steps described above.

In yet another aspect, an advanced video encoder apparatus may comprise the methods described above.

In still another aspect of the invention, a Rate-QP estimator apparatus for an I picture may comprise: (a) an input for a data stream comprising a group of pictures (GOP); (b) means for processing an input I picture within the input group of pictures to calculate a bit rate corrected Rate-QP, R(QP), for the input I picture; and (c) a computer readable medium output comprising the bit rate corrected Rate-QP, R(QP), for the input I picture.

Here, the means for processing may comprise: an executable computer program resident within a program computer readable medium.

Further, the means for processing step may comprise: (a) means for estimating a set of accumulated histograms of transform coefficients of the input I picture; and (b) means for estimating the bit rate corrected Rate-QP, R(QP), from the set of accumulated histograms of transform coefficients.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL
VIEWS OF THE DRAWING(S)

The invention will be more fully understood by reference to the following drawings which are for illustrative purposes only:

FIG. 2 is a flow chart of an execution model of an advanced video encoder comprising an encoder front end and an encoder back end.

Figure 9:
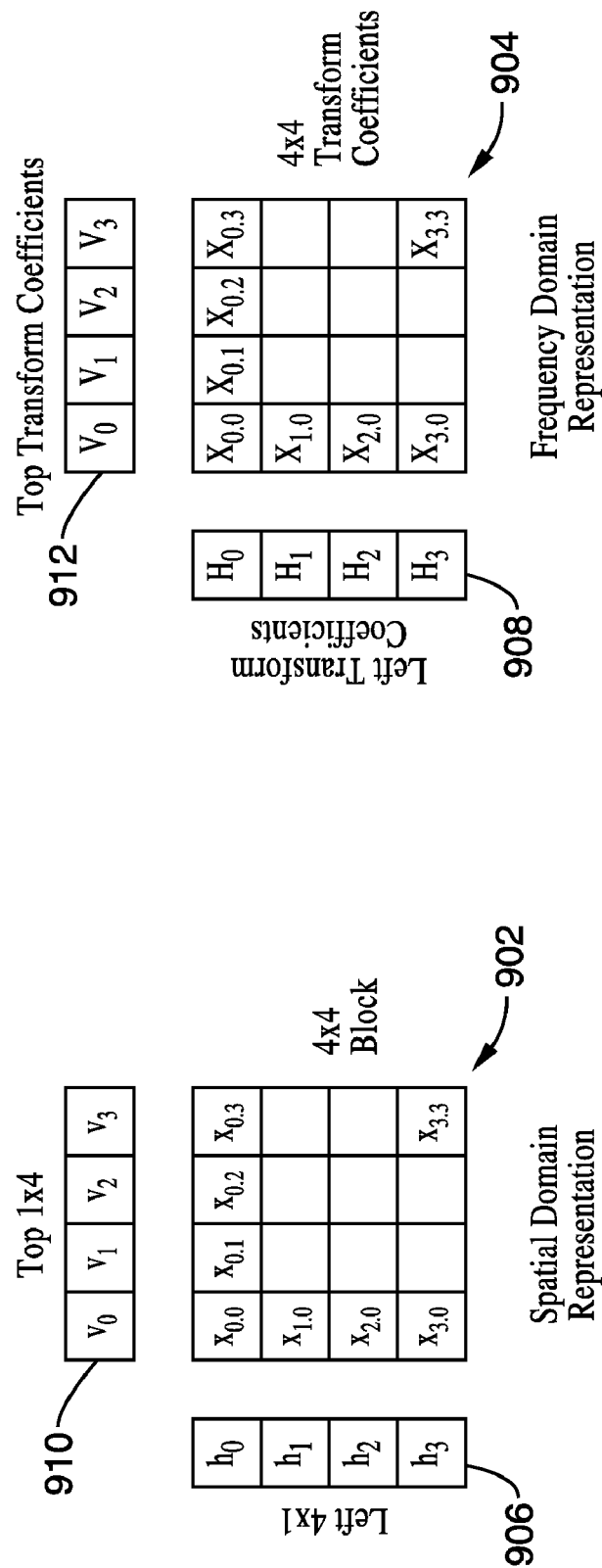

FIG. 9A is a matrix of the 4×1 vector $\vec{h}$ to the left to the 4×4 block and 1×4 element vector $\vec{v}$ above the 4×4 block.

FIG. 9B is a matrix of the left normalized transform coefficients and the top normalized transform coefficients that correspond to the left 4×1 and top 1×4 elements of FIG. 9A, which depicts the relationship between the spatial and frequency domain intra predictors for the horizontal and vertical modes.

Figure 10:
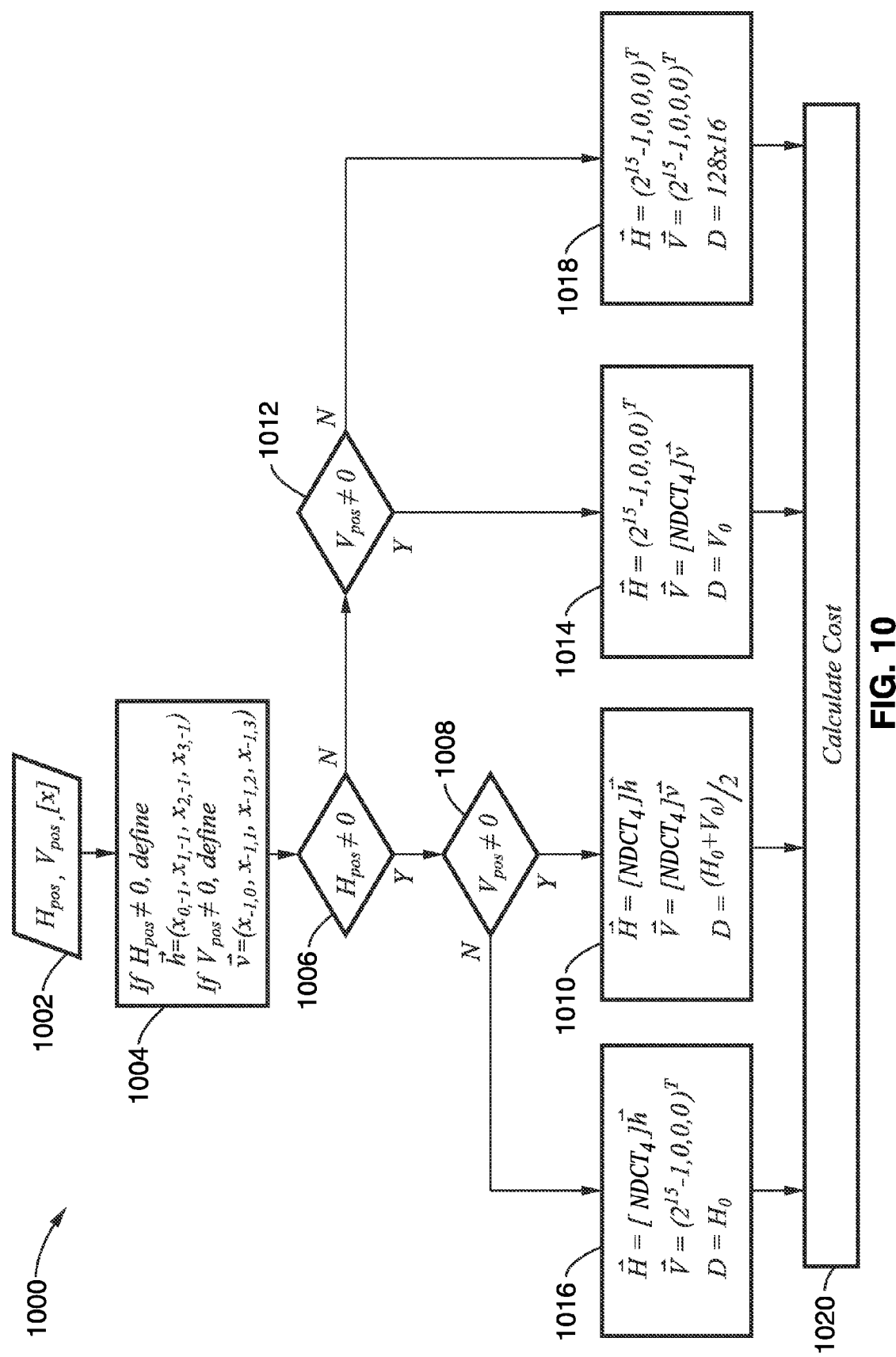

FIG. 10 is a flowchart that details the computation of the frequency domain predictors for the intra vertical, horizontal, and steady state (or DC) intra modes.

Figure 11:
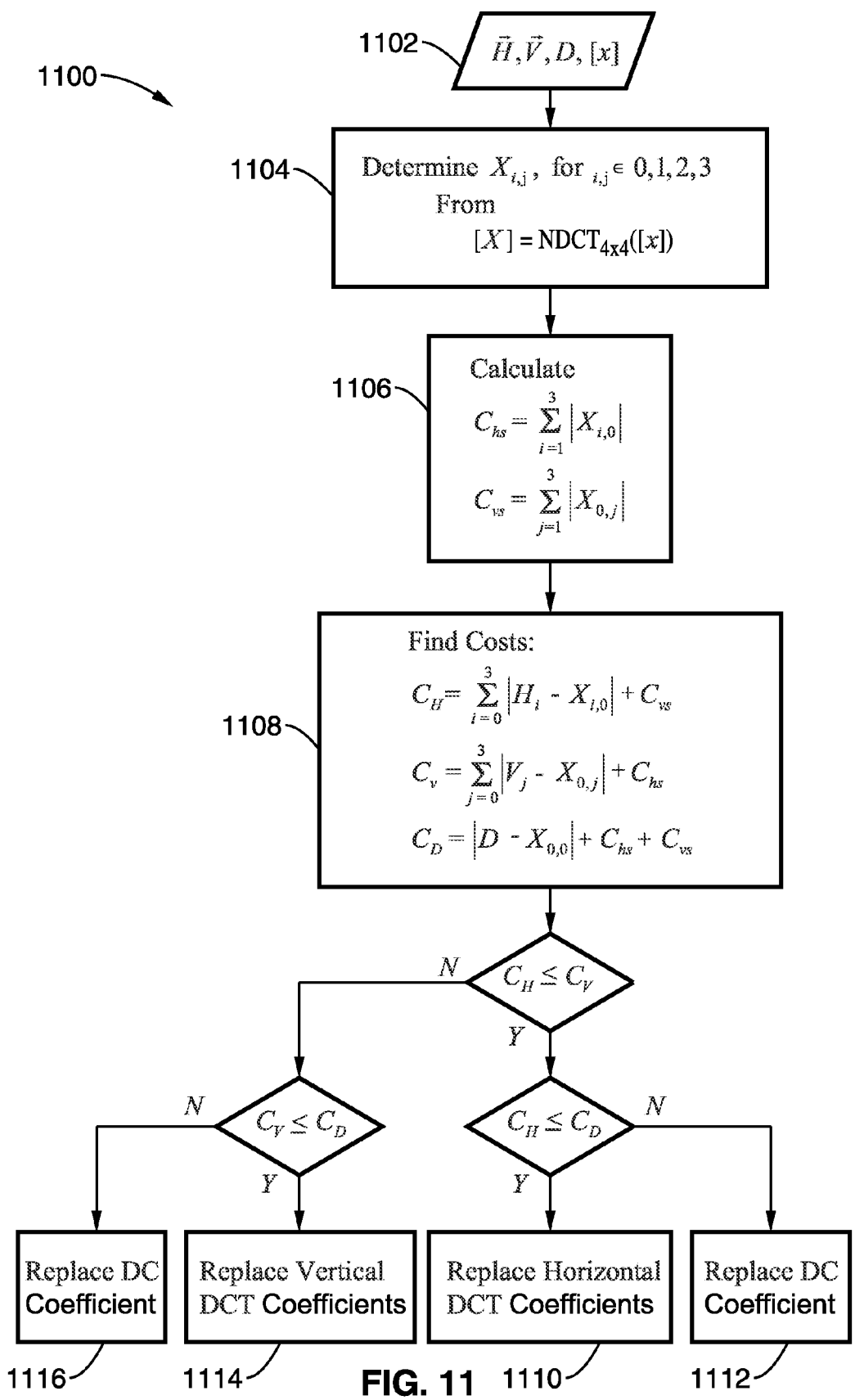

FIG. 11 is a flowchart that predicts the SATD costs of the various horizontal, vertical, or DC predictions. Using these costs, intra normalized DCT coefficients with the least SATD is output.

Figure 12:
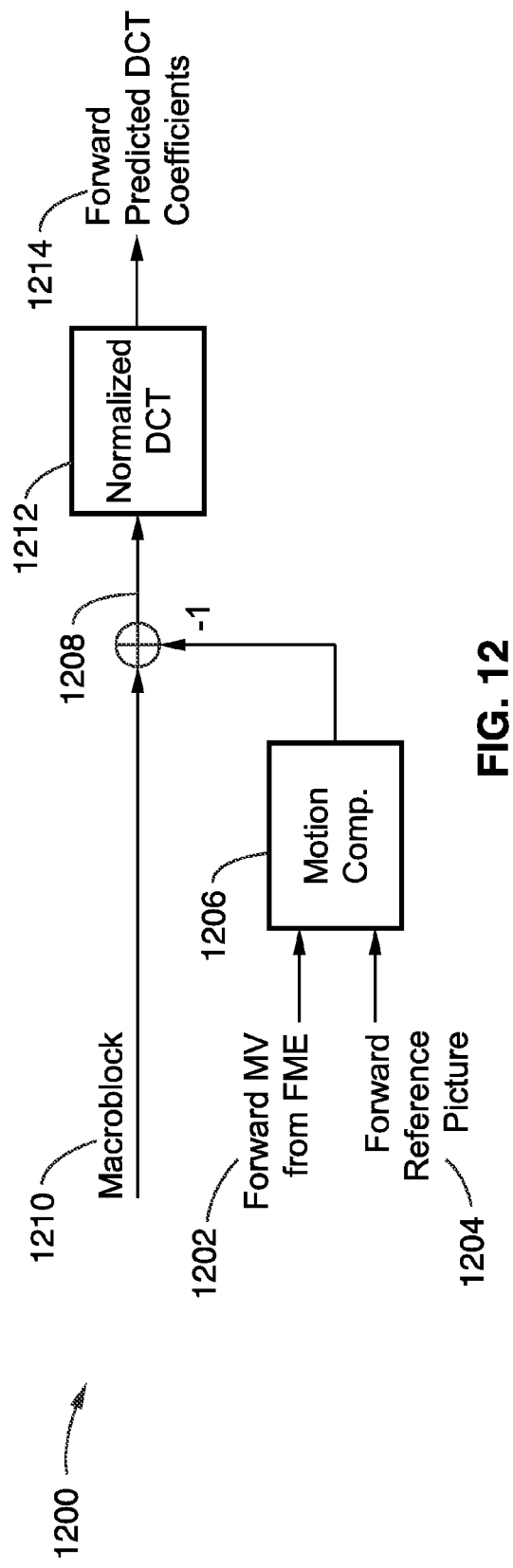

FIG. 12 is a flowchart showing how the forward motion vector (MV) from the forward motion estimator (FME) is used to obtain the normalized forward predicted DCT coefficients.

Figure 13:
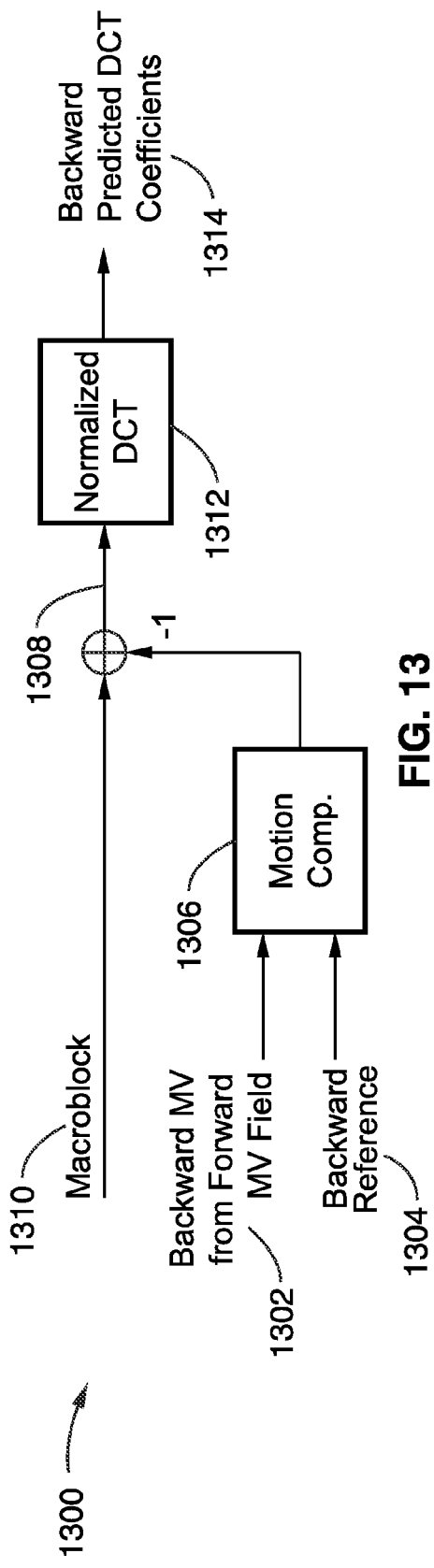

FIG. 13 is a flowchart showing how the backward motion vector from the FME is used to obtain the normalized backward predicted DCT coefficients.

Figure 14:
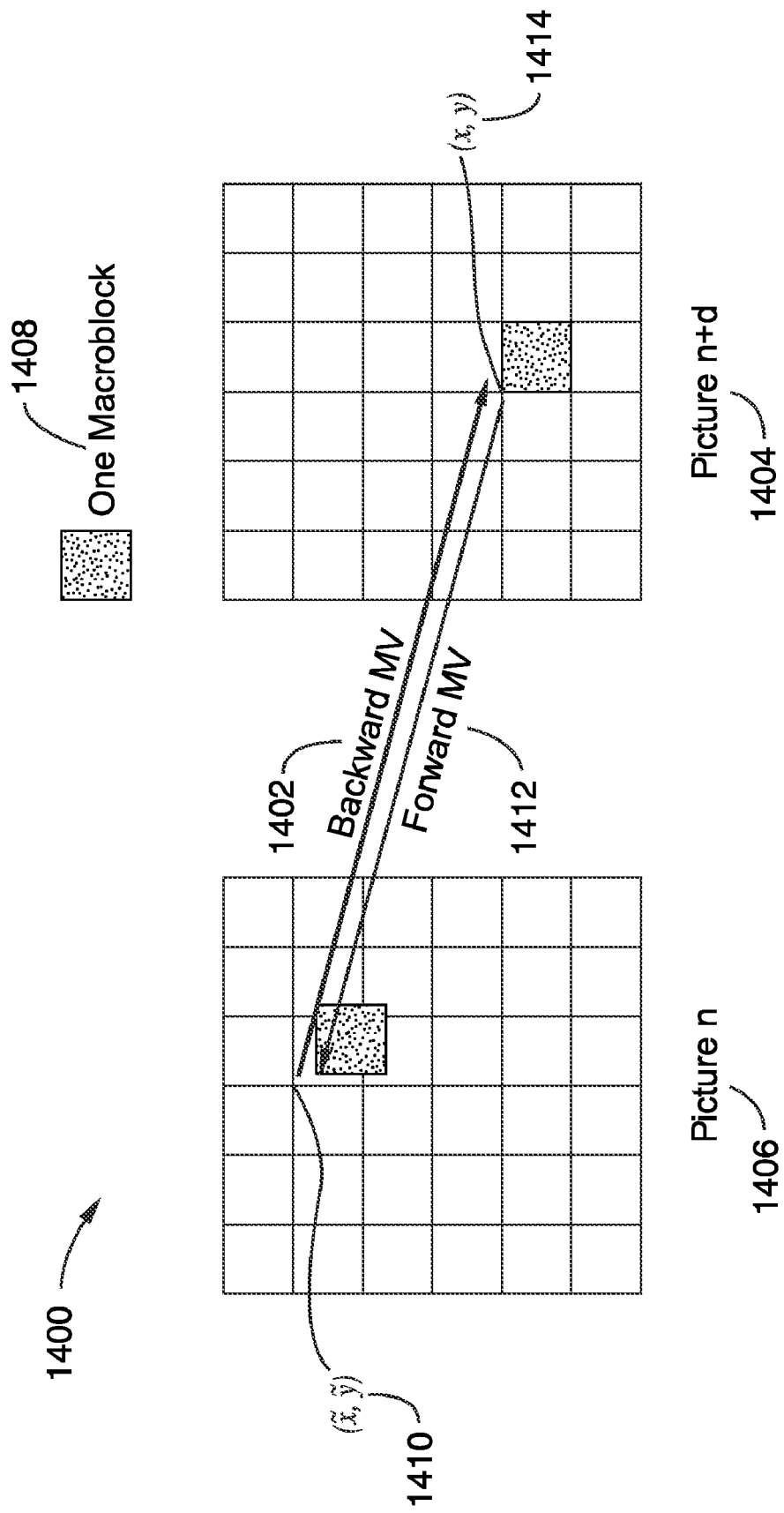

FIG. 14 is graphical view of forward and backward motion vectors, showing that the forward motion vector (mvx,mvy) of a macroblock at pixel coordinates (x,y) in picture (n+d) is mapped to a backward motion vector (−mvx,−mvy) of the nearest macroblock from (x+mvx,y+mvy) in picture n, where d=2 for a field picture, and d=1 for a frame picture.

Figure 15:
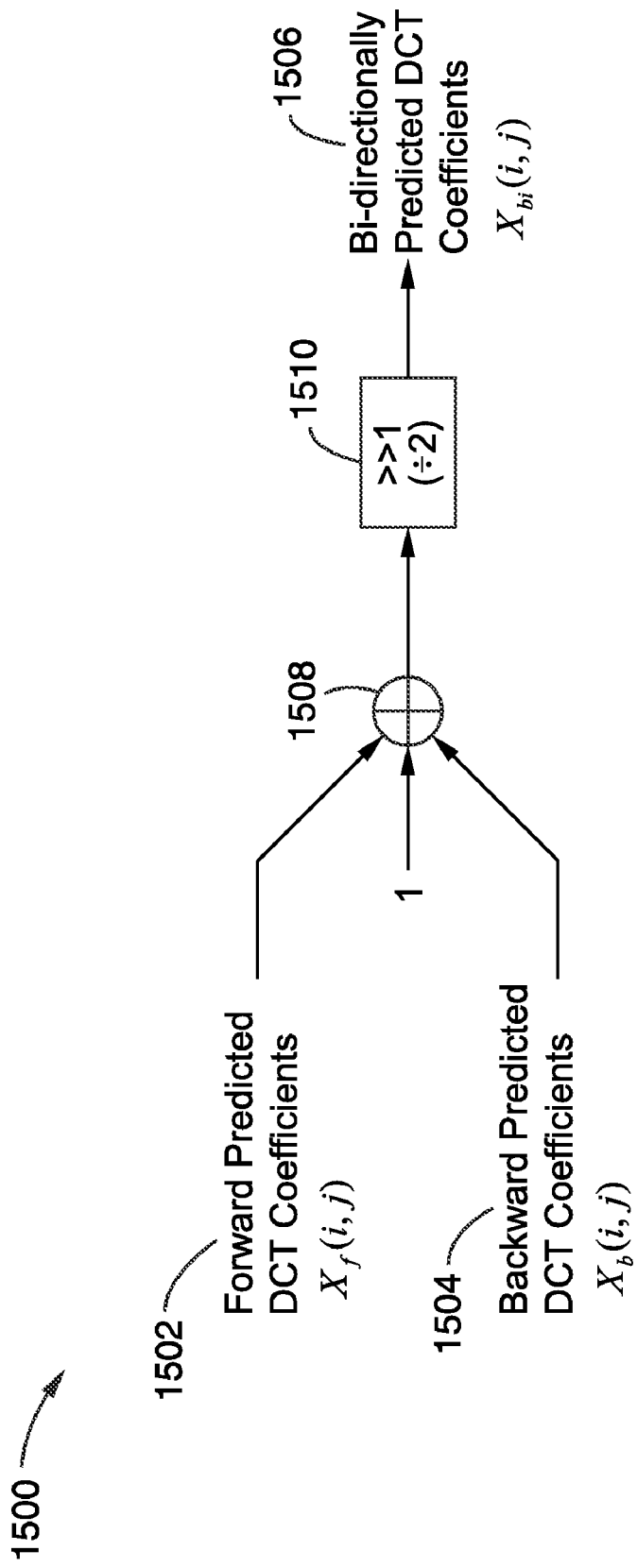

FIG. 15 is a flowchart that shows the bi-directionally predicted DCT coefficients are the average of the forward and backward predicted DCT coefficients.

Figure 16:
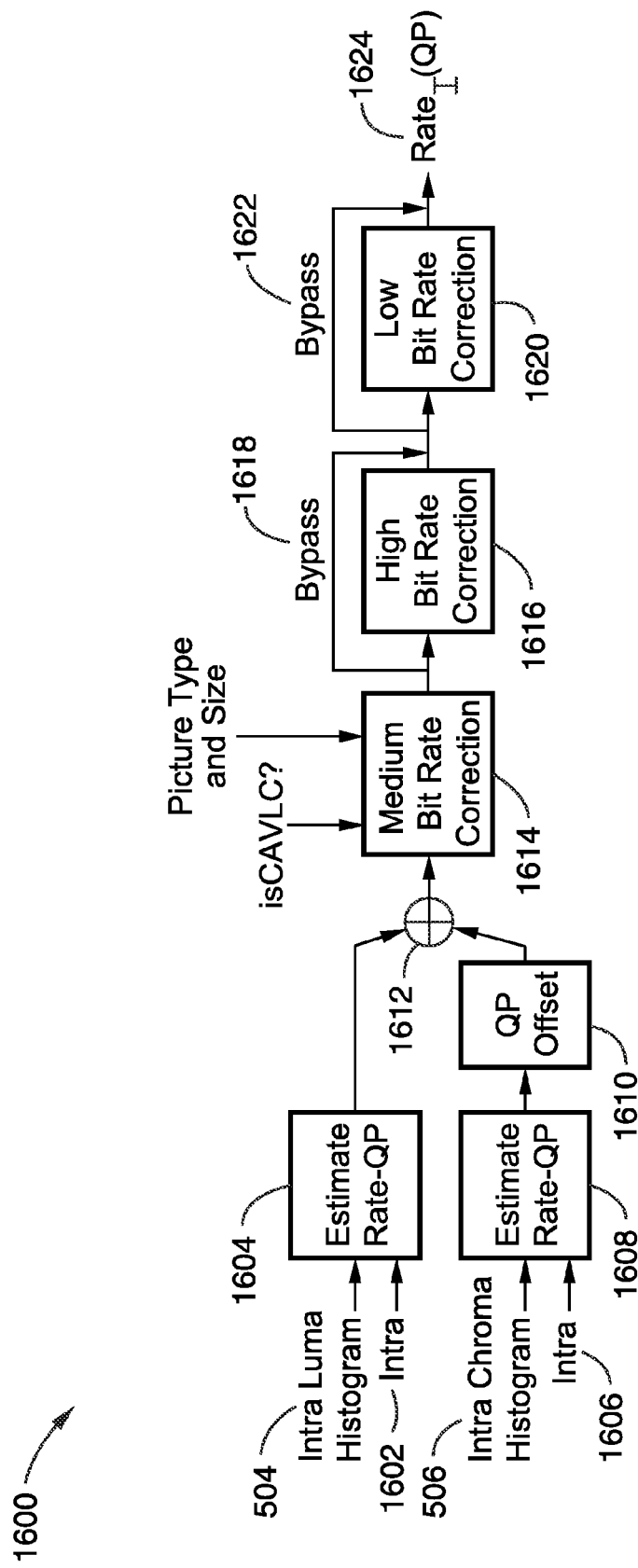

FIG. 16 is a flowchart that shows how to estimate the I picture R(QP) relationship from transform coefficient histograms.

Figure 17:
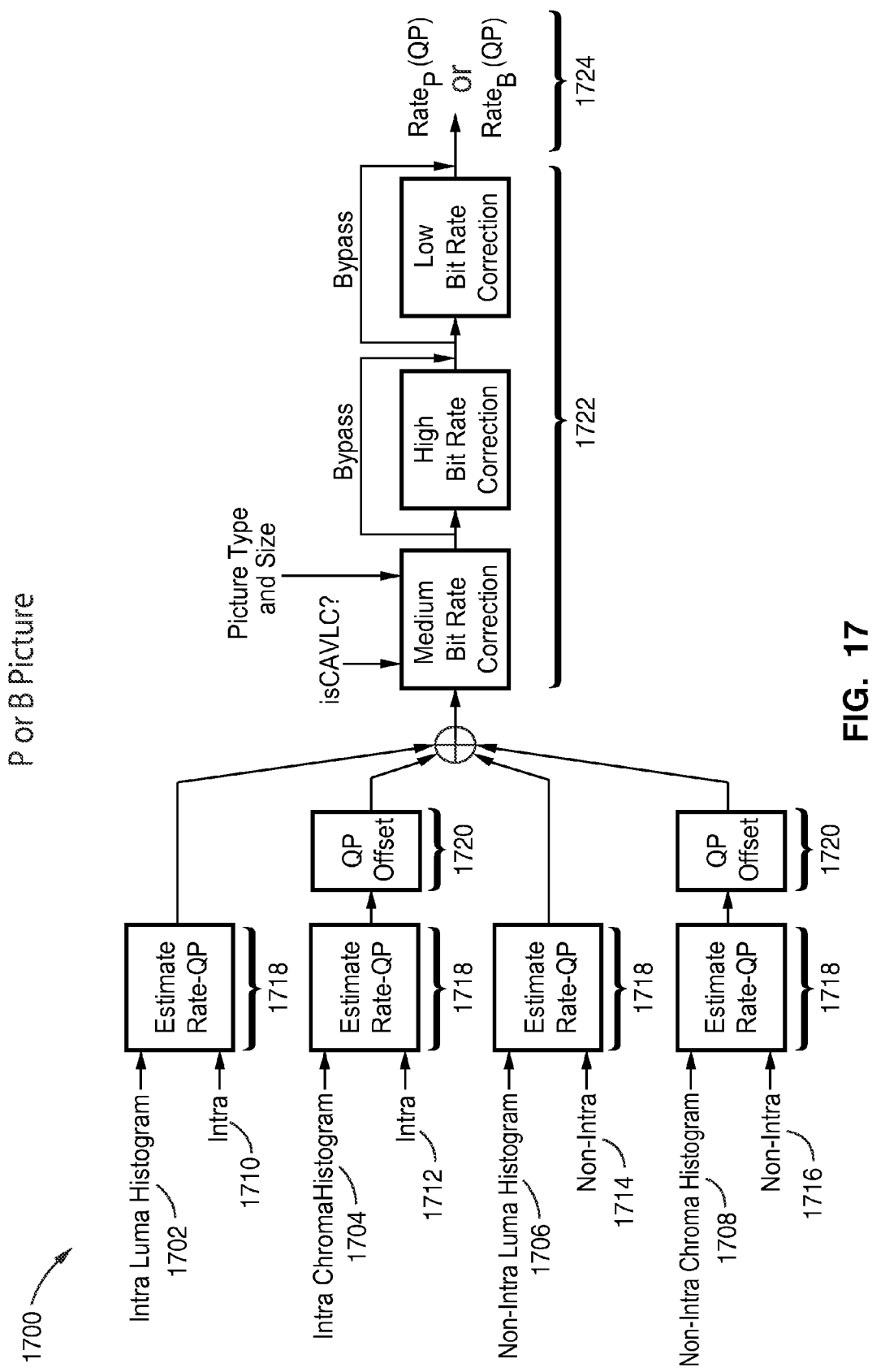

FIG. 17 is a flowchart that shows how to estimate the P or B picture R(QP) relationships from transform coefficient histograms.

Figure 18:
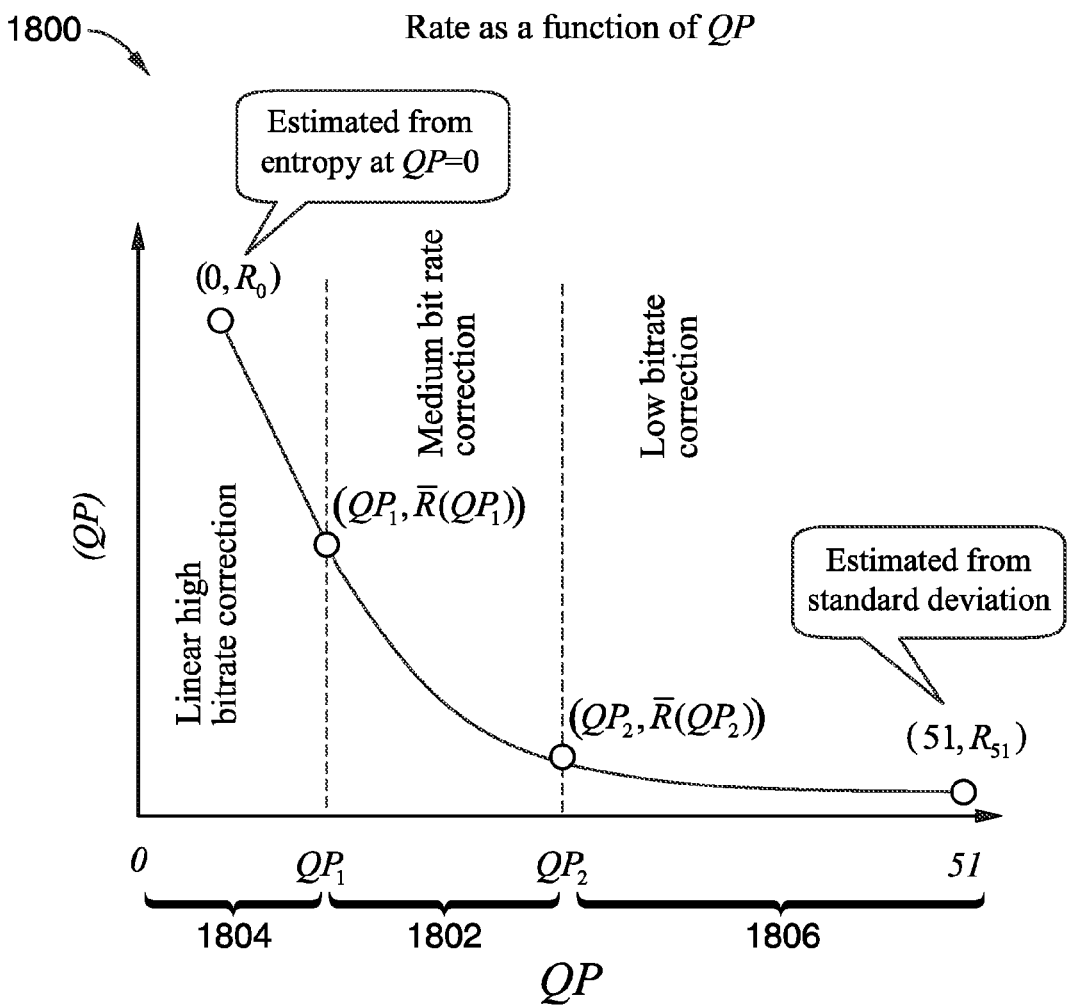

FIG. 18 is a graph that shows how to physically interpret the three models used in different regions of the bit rate estimation, with the ordinate being the quantization parameter (QP), and the abscissa being the rate based on the quantization parameter R(QP).

Figure 19:
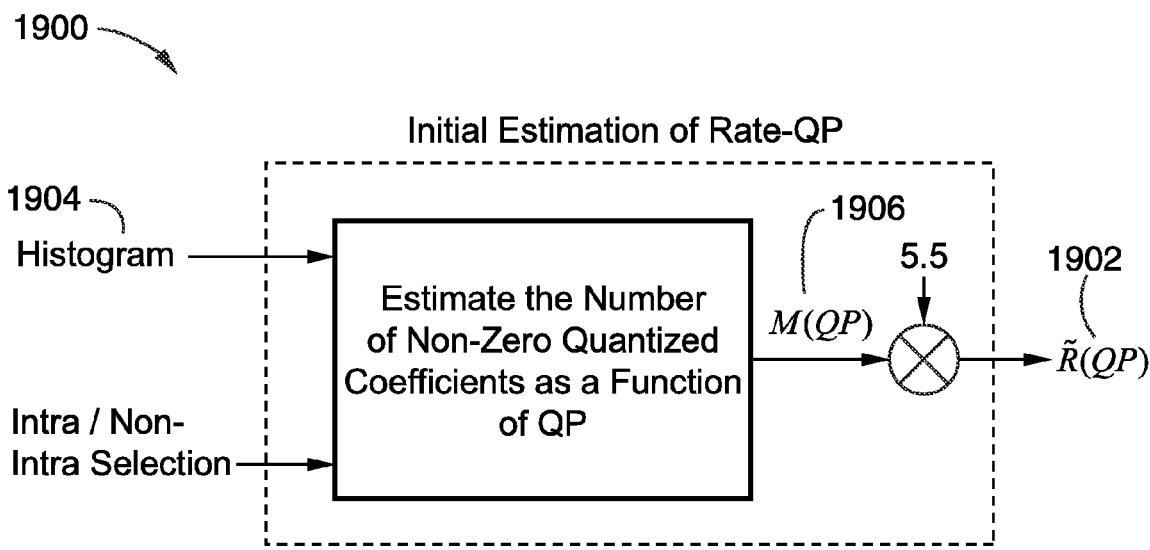

FIG. 19 is a flow chart showing that the estimation of R(QP) relationship process has two parts. First, the number of non-zero coefficients at a given QP is estimated. Second, the number of non-zero coefficients is multiplied by 5.5 to provide an initial R(QP) estimate.

Figure 20:
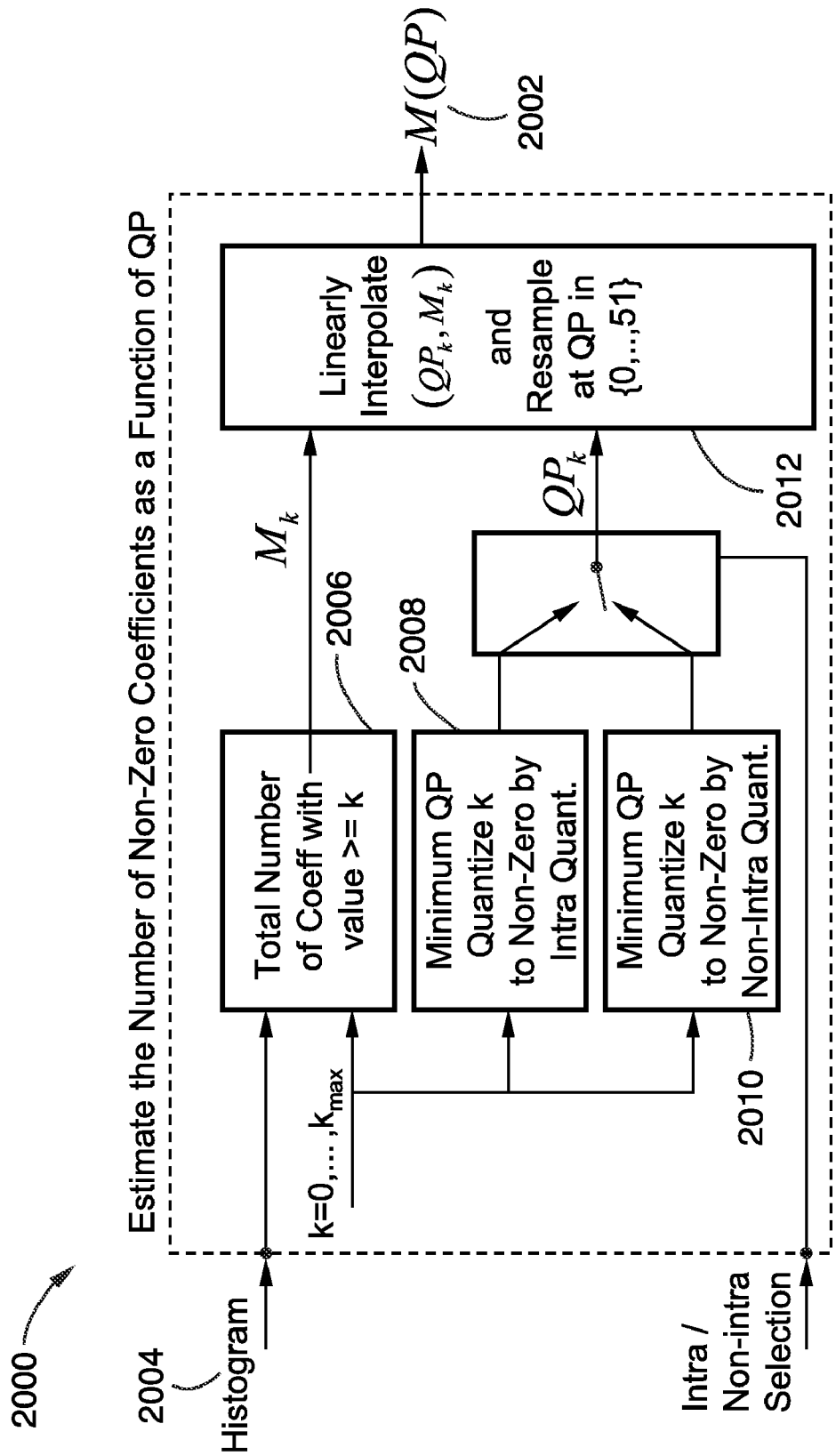

FIG. 20 is a flow chart showing that the number of non-zero coefficients at a given QP is obtained by linear interpolation of the points on the graph that consists of the number of coefficients with value k, and the minimum value of QP that would quantize k to one. The graph as a function of QP is re-sampled to obtain M(QP) at QP=0 . . . 51.

Figure 21:
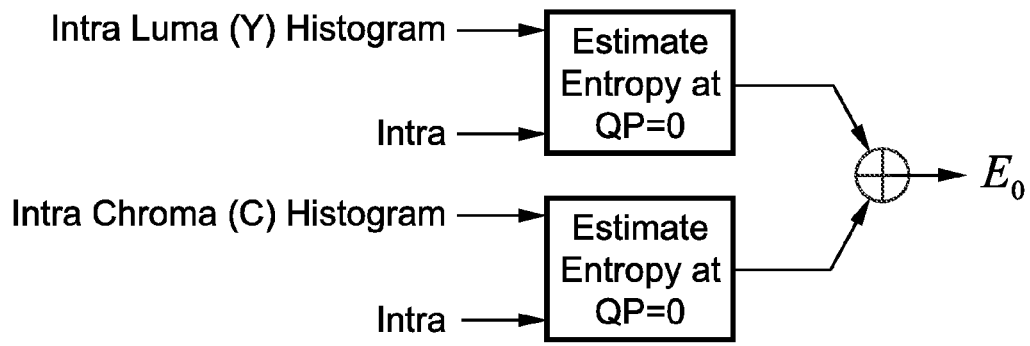

FIG. 21 is a flow chart showing that the estimated bit rate of an I picture at QP=0 is the sum of the chroma and luma estimates.

Figure 22:
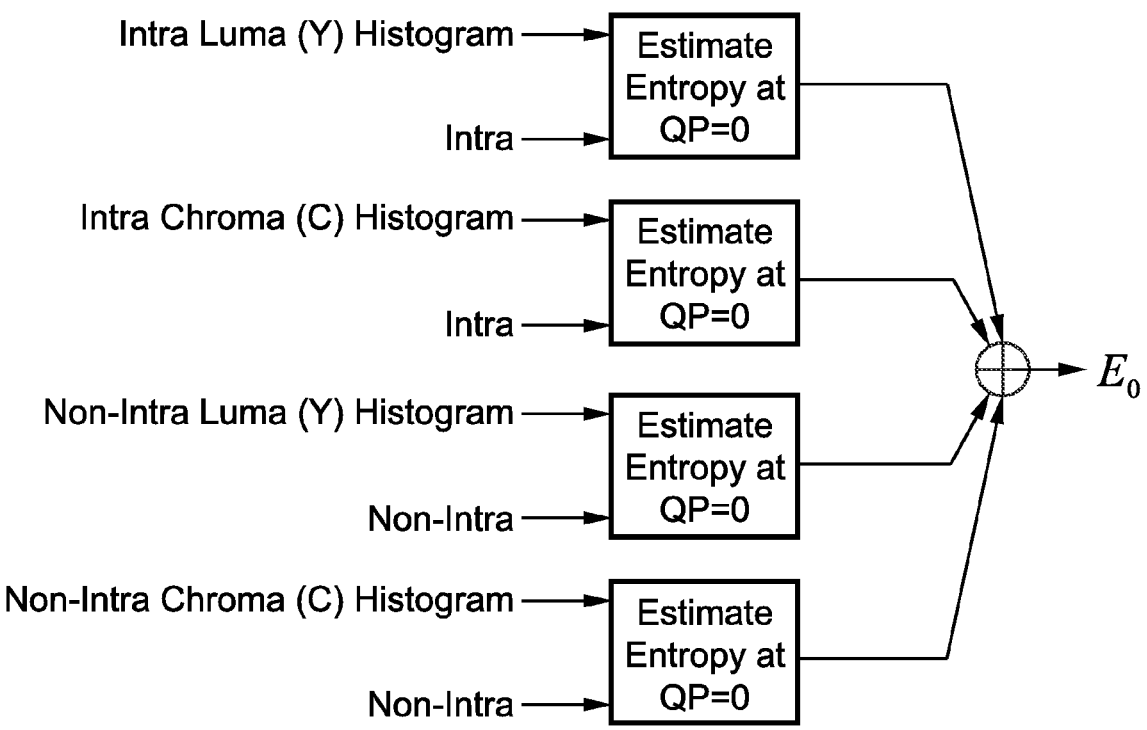

FIG. 22 is a flow chart showing that the estimated bit rate of a P or B picture at QP=0 is the sum of the chroma/luma and intra/non-intra estimates.

Figure 23:
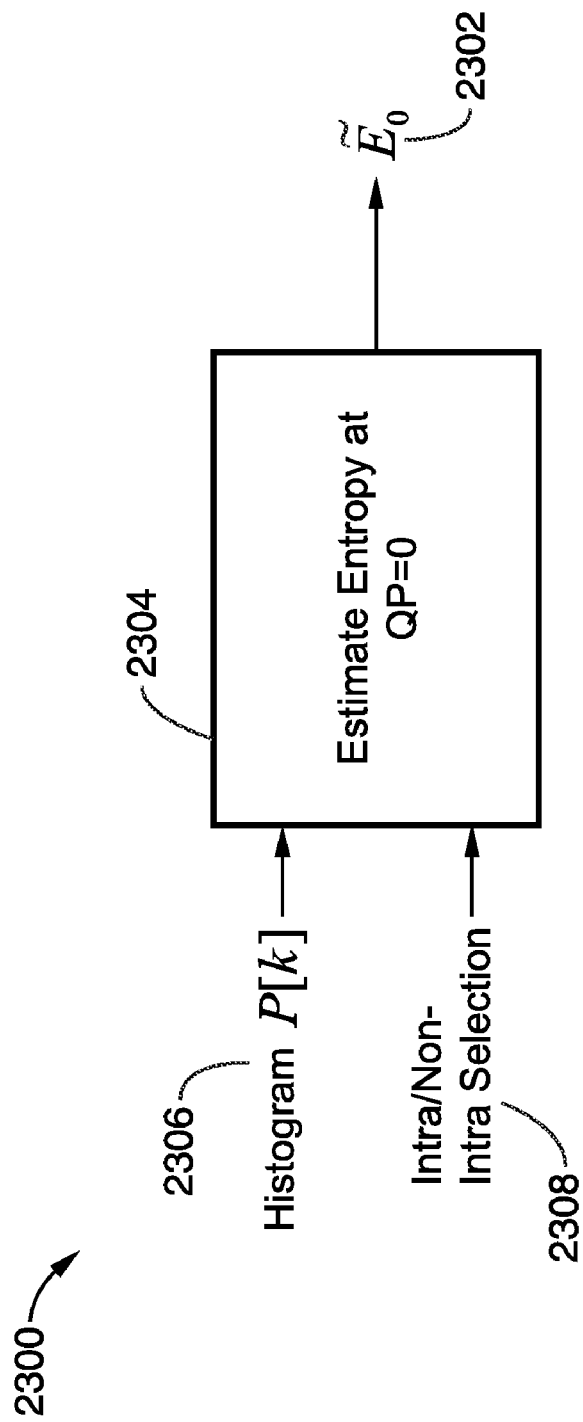

FIG. 23 is a flow chart showing that the entropy estimate at QP=0 is estimated from the corresponding histogram P[k].

DETAILED DESCRIPTION OF THE INVENTION

Referring more specifically to the drawings, for illustrative purposes the present invention is embodied in the apparatus generally shown in FIG. 1A through FIG. 23. It will be appreciated that the apparatus may vary as to configuration and as to details of the parts, and that the method may vary as to the specific steps and sequence, without departing from the basic concepts as disclosed herein.

DEFINITIONS

"Computer" means any device capable of performing the steps, methods, or producing signals as described herein, including but not limited to: a microprocessor, a microcontroller, a video processor, a digital state machine, a field programmable gate array (FGPA), a digital signal processor, a collocated integrated memory system with microprocessor and analog or digital output device, a distributed memory system with microprocessor and analog or digital output device connected by digital or analog signal protocols.

"Computer readable medium" means any source of organized information that may be processed by a computer to perform the steps described herein to result in, store, perform logical operations upon, or transmit, a flow or a signal flow, including but not limited to: random access memory (RAM), read only memory (ROM), a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and information transmitted by electromagnetic or optical methods including, but not limited to, wireless transmission, copper wires, and optical fibers.

"SATD" means the Sum of Absolute Transformed Differences, which is a widely used video quality metric used for block-matching in-motion estimation for video compression. It works by taking a frequency transform, usually a Hadamard transform, of the differences between the pixels in the original block and the corresponding pixels in the block being used for comparison. The transform itself is often of a small block rather than the entire macroblock to minimize computation costs. For example, in H.264/AVC, a series of 4×4 blocks are transformed rather than doing more processor-intensive 8×8 or 16×16 transforms.

"GOP (Group of Pictures)" means P and/or B-frames between successive I-frames in an MPEG signal. A GOP is usually about 15 frames long in an NTSC system. The length of a GOP can vary depending on editing needs. The length of a GOP represents the editing capability of an MPEG signal. If an edit occurs within a GOP, an MPEG decoder/recoder will be needed to reclose the GOP. For bit estimation, a GOP is defined as a consecutive sequence of pictures with any combination of I, P, and B pictures.

"Context-adaptive binary arithmetic coding (CABAC)" means an algorithm for lossless compression of syntax elements in the video stream knowing the probabilities of syntax elements in a given context. CABAC compresses data more efficiently than CAVLC but requires considerably more computational processing to decode.

"Context-adaptive variable-length coding (CAVLC)" means a method for the coding of quantized transform coefficient values that is a lower-complexity alternative to CABAC. Despite having a lower complexity than CABAC, CAVLC is more elaborate and more efficient than the methods typically used to code coefficients in other prior designs.

"I, P, B frames" mean the three major picture types found in typical video compression designs. They are I(ntra) (or key) pictures, P(redicted) pictures, and B(i-predictive) pictures (or B(i-directional) pictures). They are also commonly referred to as I frames, P frames, and B frames. In older reference documents, the term "bi-directional" rather than "bi-predictive" is dominant.

"Y" means the luminance (or luma) signal or information present in an image. It is the black and white portion that provides brightness information for the image.

"C" means the chrominance (or chroma) signal or information present in an image. It is the color portion that provides hue and saturation information for the image.

"SD" means standard definition video.

"HD" means high definition video.

Two dimensional "DCT" (Discrete Cosine Transformation) means a process that converts images from a two-dimensional (2D) spatial domain representation to a two-dimensional (2D) frequency domain representation by use of Discrete Cosine Transform coefficients. This process is typically used in MPEG and JPEG image compression.

"Quantization" means the conversion of a discrete signal (a sampled continuous signal) into a digital signal by quantizating. Both of these steps (sampling and quantizing) are performed in analog-to-digital converters with the quantization level specified in bits. A specific example would be compact disc (CD) audio which is sampled at 44,100 Hz and quantized with 16 bits (2 bytes) which can be one of 65,536 (i.e. 216) possible values per sample.

"Quantizating", in digital signal processing parlance, means the process of approximating a continuous range of values (or a very large set of possible discrete values) by a relatively-small set of discrete symbols or integer values. More specifically, a signal can be multi-dimensional and quantization need not be applied to all dimensions. Discrete signals (a common mathematical model) need not be quantized, which can be a point of confusion.

Introduction

Basics of the Rate-QP Estimation Algorithm

The Rate-QP estimation algorithm in this invention is based on non-linear approximation theory, where the number of bits, R, for encoding a picture by transform coding, is proportional to the number of nonzero quantized transform coefficients, M, such that the average bit per coefficient R/M=r is approximately constant.

Since the bits per coefficient, r, is approximately constant, a method to estimate the number of bits R for encoding picture with a quantization parameter QP is to estimate the number of non-zero quantized transform coefficients M and then obtain the bit estimate by R=rM.

A novel method for estimating the number of non-zero quantized transform coefficients M as a function of the quantization parameter QP is to estimate it from the histogram of the DCT coefficients. Let x be the absolute amplitude of a DCT coefficients and let the histogram P(x) be the frequency of occurrence of DCT coefficients with absolute amplitude x in a picture. Then the number of non-zero quantized coefficients as a function of the quantization parameter is $$M(QP) = \int_{Q(x,QP) \geq 1} P(x) dx$$

where Q(x,QP) is the quantized value of x with quantization parameter QP.

Figure 1A:
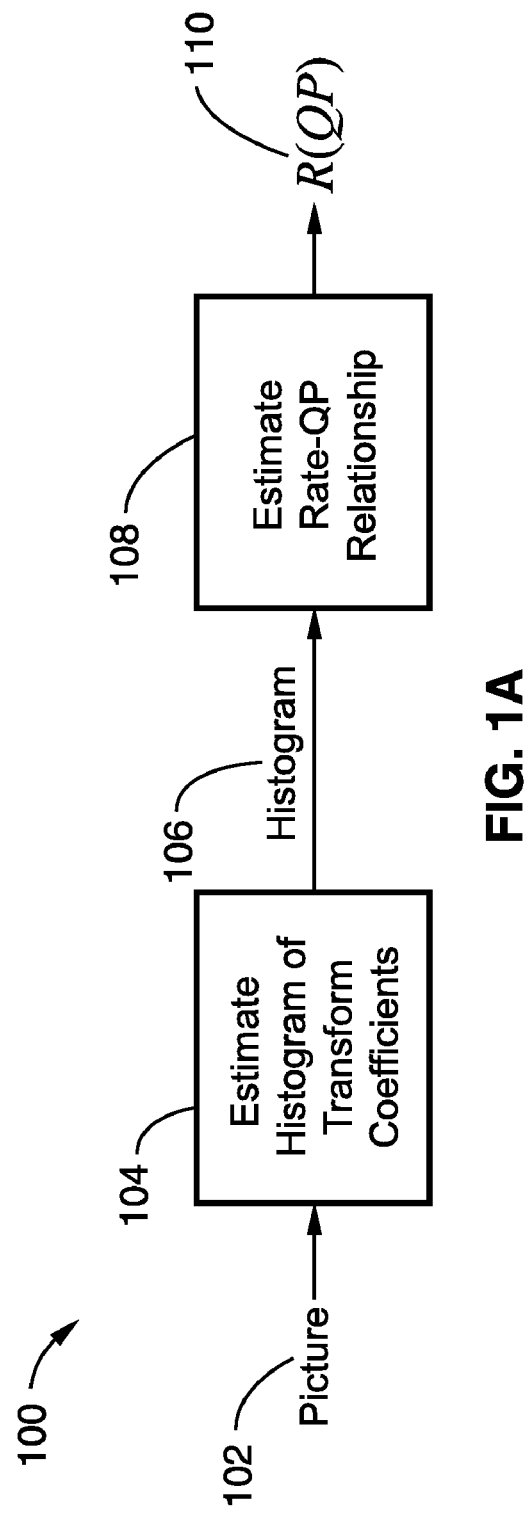
FIGS. 1A and 1B is a flow chart of showing how the R(QP) function is estimated from the histogram of the transform coefficients of an input picture.
Figure 1B:
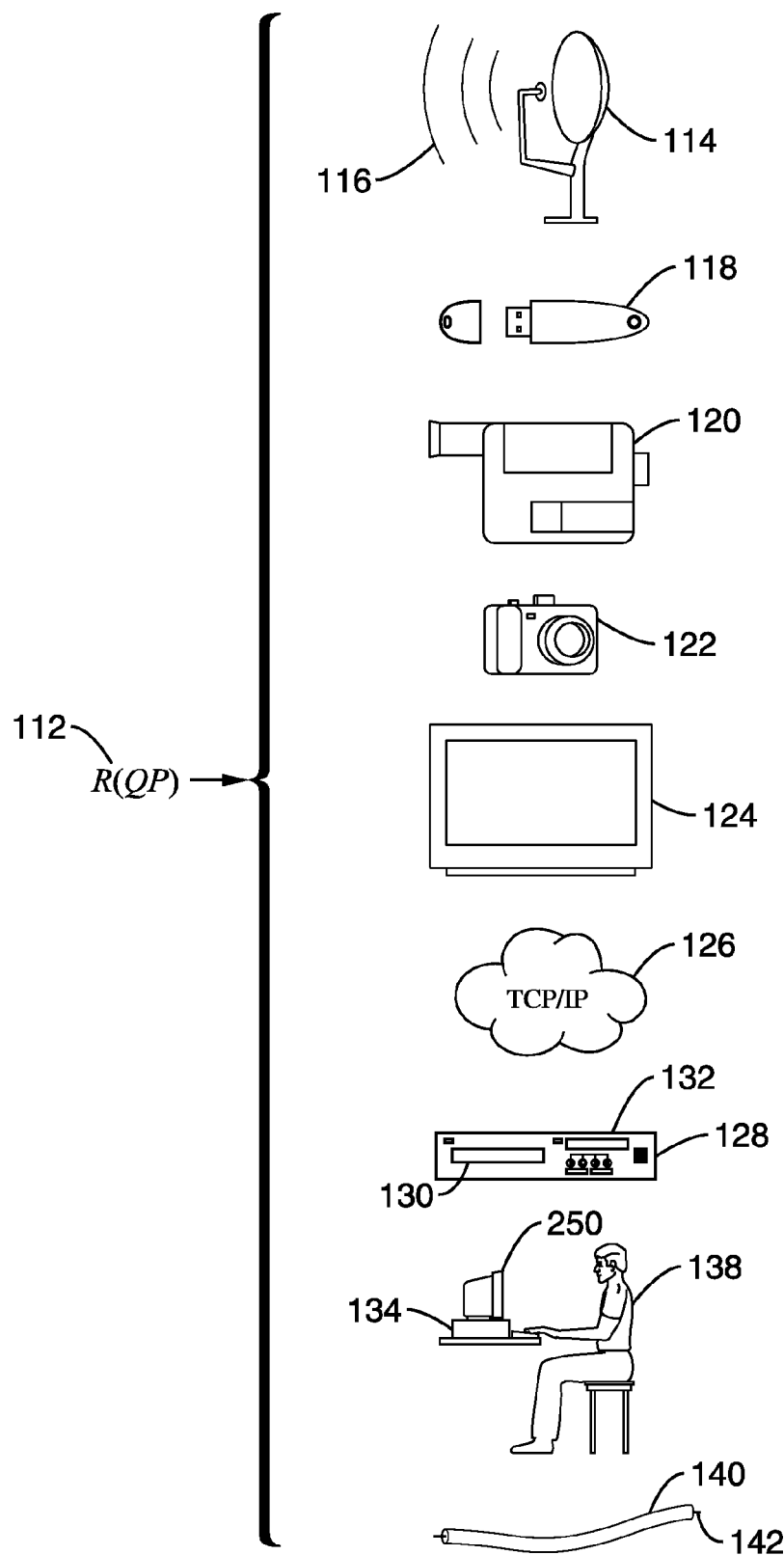

Refer now to FIG. 1A, which shows that the rate estimation algorithm has two parts 100. An input picture stream 102 is used in the first part to generate estimates of the histogram of the DCT coefficients 104 of the input picture 102, which results in an output histogram of the transform coefficients 106. The transform coefficient histogram 106 is used as an input to a second stage 108, which estimates and outputs the rate R as a function of the quantization parameter QP, R(QP), 110 from the histogram. FIG. 1B shows the result is then used 112 as a bit rate corrected Rate-QP (R(QP)) for the input P picture in various example manner as seen by blocks 114, 116, 118, 120, 122, 124, 126, 128, 130, 132, 134, 138, 140, 142, and 250.

Bit Estimations

An Execution Model for an Advanced Encoder

The bit estimation algorithm is best described with the following simplified execution model of advanced video encoder.

Refer now to FIG. 2, an advanced video encoder 200 consists of a front end 202 and a back end 204. The front end 202 comprises a forward motion estimator (FME) 206 and a Picture Type Determiner (PTD) 208. The backend 204 comprises a Forward and Backward Motion Encoder (FBME) that also performs Mode decisions and Macroblock (MM) 210 coding. These outputs of the FBME/MM 210 are coded in a Coding block 212. Thus, overall, an input picture 214 is used to produce an output bit stream 216 through the advanced video encoder 200.

The bit estimation method presented here takes place within the encoder front end 202. No information from the back end 204 is necessary in the bit estimation process.

In the front end 202, pictures are read by FME 206 where the forward motion estimation 206 is performed by using the original pictures 214 as reference pictures. After the forward motion fields have been computed by FME 206 for a sequential number of pictures 214 (hence the Long Delay 218), the PTD 208 determines the picture type and group of picture structure. Then in the back end 204, FBME/MM 210 re-computes the forward and backward motion vectors when needed based on the reconstructed pictures. The FBME/MM 210 additionally performs the mode decisions and macroblock coding. Based on the information from FBME/MM 210, the Coding 212 block generates the final output bit stream 216.

An Execution Model of Bit Estimation in the Advanced Encoder

The histogram and bit estimation for each picture 214 is performed in FME 206. In general, for each input picture 214 to FME 206, the method here computes three bit estimates: (1) one I picture estimate, (2) one P picture estimate, and (3) one B picture estimate. In this way, no assumption is made regarding the picture type and the GOP structure in the picture bit estimation. Such parallel calculations are also well suited for customized video processors or other computers that are capable of parallel pipeline calculations.

The GOP bit estimation is performed after PTD 208. After the PTD 208, the picture type and GOP structure is known. Therefore, that information is used to select the corresponding bit estimate out of the I, P, and B bit estimates of a picture 214. The GOP bit estimation is obtained by summing up the bit estimates of each picture in a GOP with the corresponding picture type.

As shown in Table 1 and Table 2, the FME computes the forward motion estimation of the input picture in display order of a video sequence with N pictures. In general the bit estimation is performed with one frame (two fields) delay except for the first and last frame (field pairs).

The one frame (two fields) delay is inserted in the bit estimation within the FME so that the current input picture may be used as the backward reference picture. For the field picture coding example in Table 1, after the FME is finished performing forward motion estimation for the input picture 5, the forward motion field from FME of picture 5 is converted into backward motion field of picture 3, and then bit estimation is performed on picture 3. During the bit estimation of picture 3, picture 1 is used for forward motion compensation and current input picture 5 is used for backward motion compensation.

Table 1 shows the timing diagram of FME for encoding field pictures. Since the first field pair and the last field pair in display order cannot be encoded as B pictures, only I and P picture bit estimation is performed for the first and last field pair bit. Two fields delay after the first field pair, the I/P/B bit estimation starts. Then three bit estimates are computed for each picture, one estimate for each of the I/P/B picture types.

Estimation of Transform Coefficient Histograms

Figure 3:
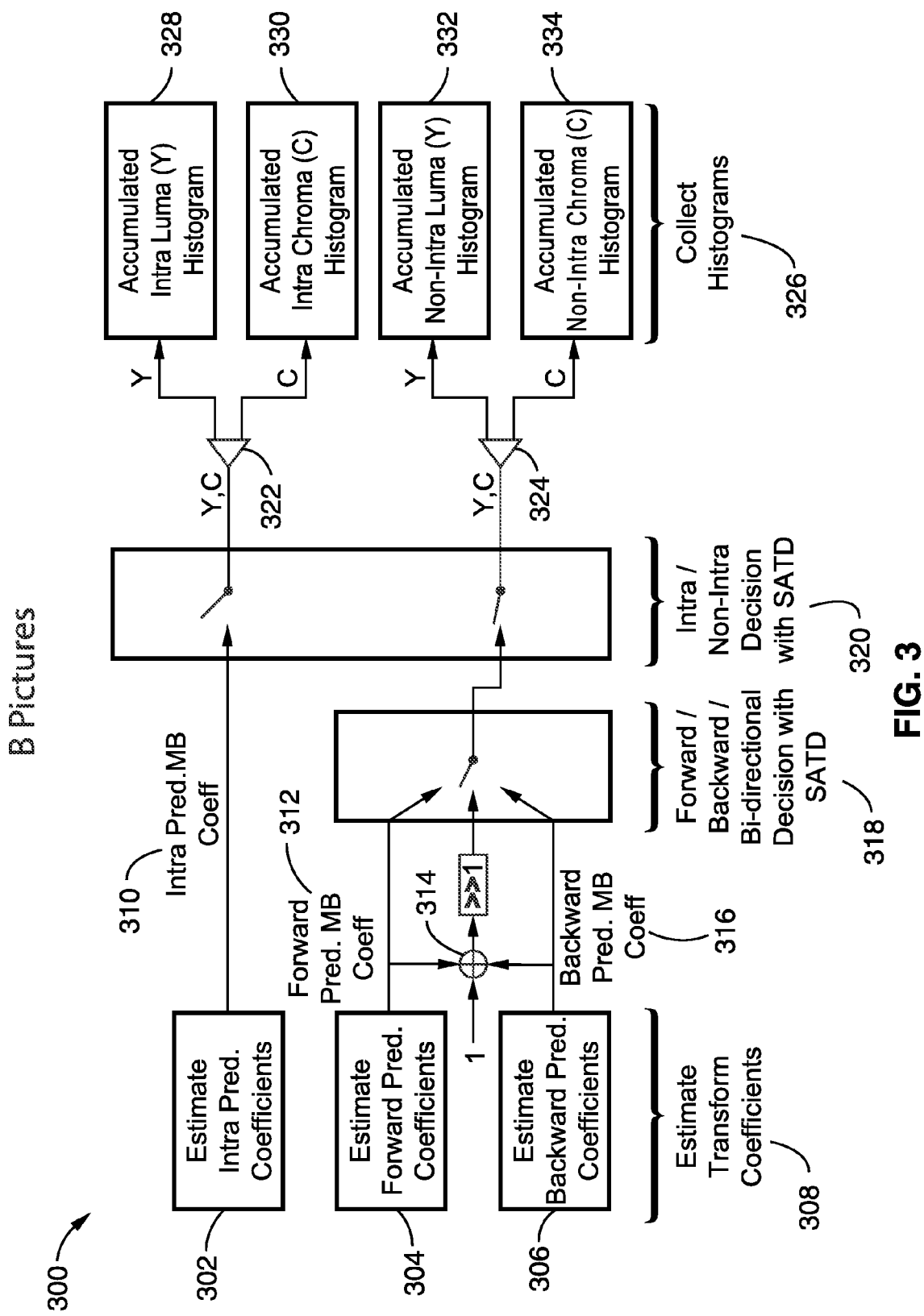
FIG. 3 is a flow chart of how four histograms of Discrete Cosine Transform (DCT) coefficients are generated and collected for each B picture in the R(QP) model.
Figure 4:
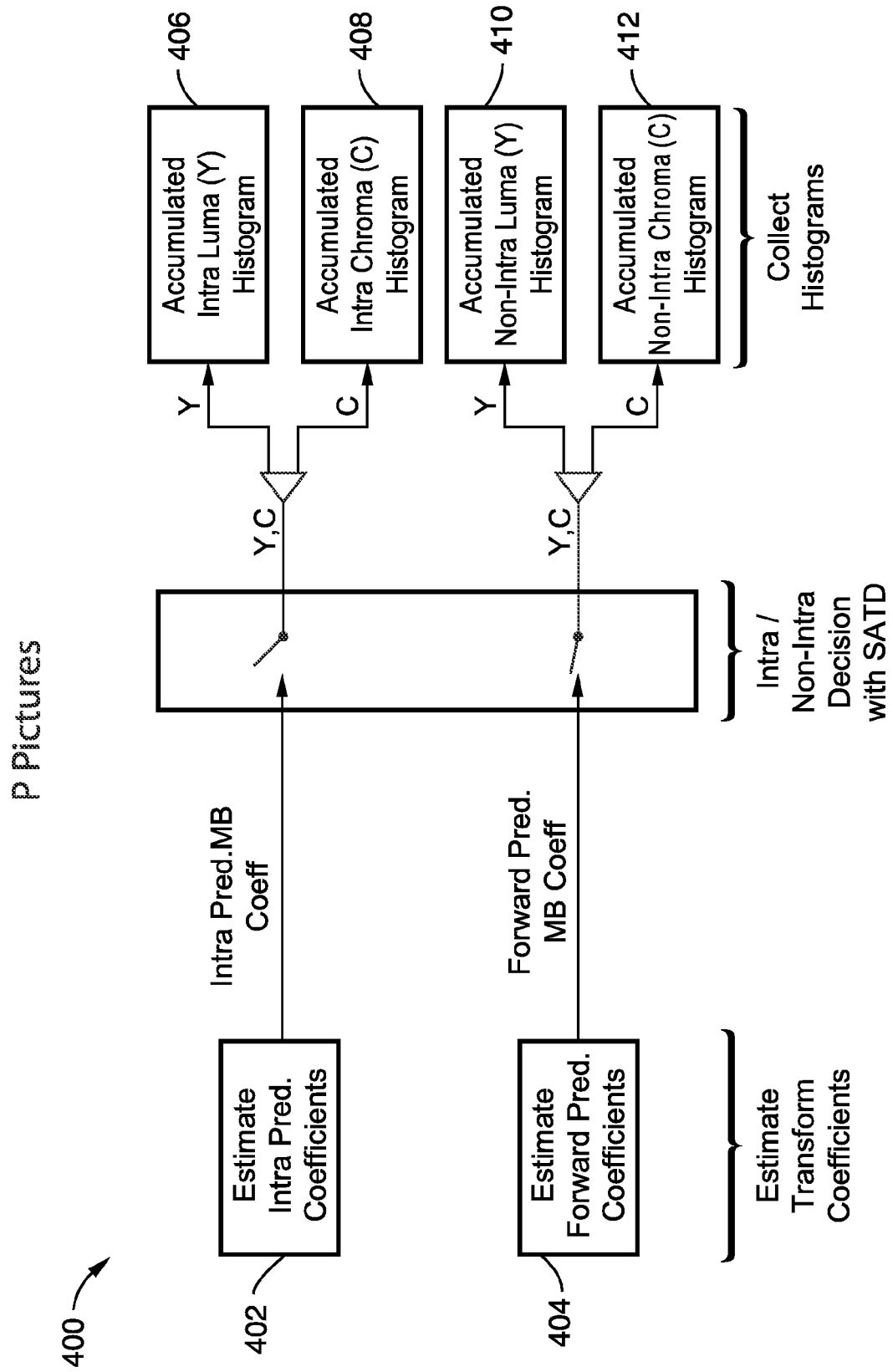
FIG. 4 is a flow chart of how four histograms of DCT coefficients are generated and collected for each P picture in the R(QP) model.
Figure 5:
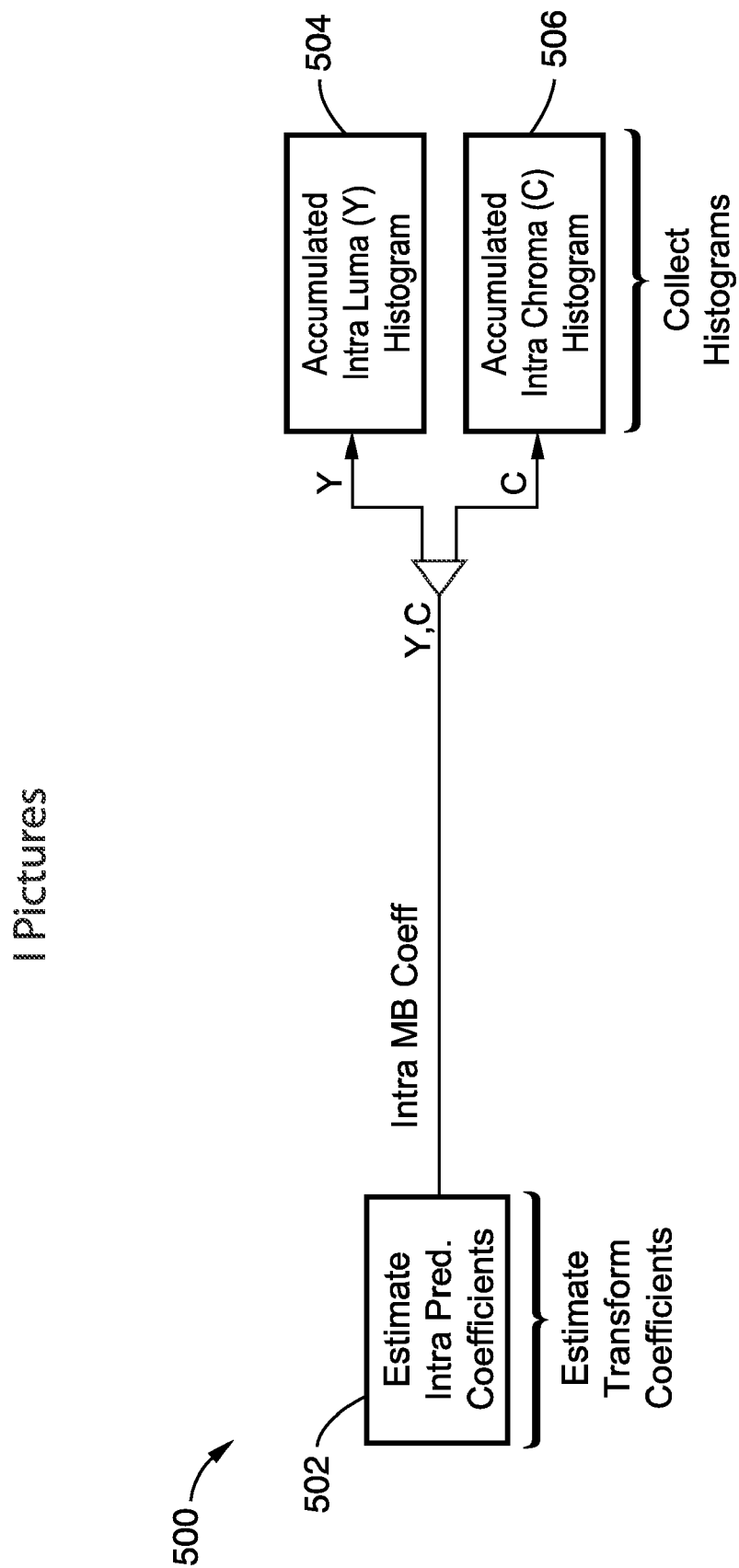
FIG. 5 is a flow chart of how two histograms of DCT coefficients are generated and collected for each I picture in the R(QP) model.

In FIGS. 3, 4, and 5 for the I/P/B picture bit estimation flowcharts, where a total of ten histograms of the DCT coefficients are collected.

Referring now to FIG. 3, the flow chart for B picture analysis 300 proceeds as follows. First, an estimate of the intra prediction coefficients 302 is generated, as well as the estimate of the forward prediction coefficients 304, and the estimate of the backward prediction coefficients 306. This step is generally referred to as estimating the transform coefficients step 308. From the estimate of the intra prediction coefficients 302 is output an intra prediction macroblock coefficient set 310. From the estimate of the forward prediction coefficients 304 an output of the forward predicted macroblock coefficients 312 is determined. An adder, 314, adds the inputs of the output of the forward predicted macroblock coefficients 312, the output of the backward predicted macroblock coefficients 316, and 1 together. The output of the adder 314 is divided by two to form an estimate of the bi-directional predicted macroblock coefficients, and inputs all these macroblock coefficients 312, 314, and 316, into a forward/backward/bi-directional decision using the lowest SATD 318. From the outputs of the intra prediction macroblock coefficient set 310 and the forward/backward/bi-directional decision using the lowest SATD 318, an intra/non-intra decision is made with the lowest SATD 320. The chrominance and luminance is separated from the output of the intra/non-intra decision made (with separators 322 and 324) with the lowest SATD 320 to form four histograms: an accumulated intra Y histogram 328, and accumulated intra C histogram 330, an accumulated non-intra Y histogram 332, and an accumulated non-intra C histogram 334. In particular, FIG. 3 shows that four histograms are collected, as collect histograms 326, for each B picture Rate-QP model.

Refer now to FIG. 4. Similar to the B picture of FIG. 3, for a P picture, another four histograms are collected 400. Here, the estimate of the intra prediction coefficients 402 and estimate of the forward prediction coefficients 404 are used to generate the four histograms: an accumulated intra Y histogram 406, an accumulated intra C histogram 408, an accumulated non-intra Y histogram 410, and an accumulated non-intra C histogram 412.

Refer now to FIG. 5, which is a flow chart 500 for generating the histograms for the I picture, where only two histograms are collected. Here, only an estimate for the intra prediction coefficients 502 is used to generate two histograms: an accumulated intra Y histogram 504, and an accumulated intra C histogram 506.

The estimation of histograms for I, P, and B models are similar. In particular, the estimations of the I and P picture histogram may be interpreted as simplifications of the B picture histogram estimation process. There are many commonality among the I, P, and B histogram estimation process.

The first commonality among the I/P/B bit estimations in FIGS. 3-5 is that the histograms of the luminance and chrominance blocks are collected separately. This is because the quantization parameters for luminance and chrominance may be different.

The second commonality is that the intra macroblocks and non-intra macroblocks are collected separately into separate histograms. This is because the dead zones in the intra quantizer and the non-intra quantizer are typically different.

The third commonality is that the forward/backward/bi-directional mode decisions and intra/non-intra mode decisions are all based on SATD. The mode with the minimum SATD is selected to be accumulated to the associated histogram.

Although not explicitly shown, the fourth commonality is that I, P, and B picture models share the same estimate of the intra DCT coefficients. Additionally, the P and B picture models share the same forward predicted DCT coefficients.

The fifth commonality is that normalized transforms are used to obtain the estimates of the transform coefficients. The normalized transform is a normalized form of the transform within the advanced video coder (AVC) that has scaling properties such that each transform coefficient results in the same amplification.

Normalized Transforms

Figure 6:
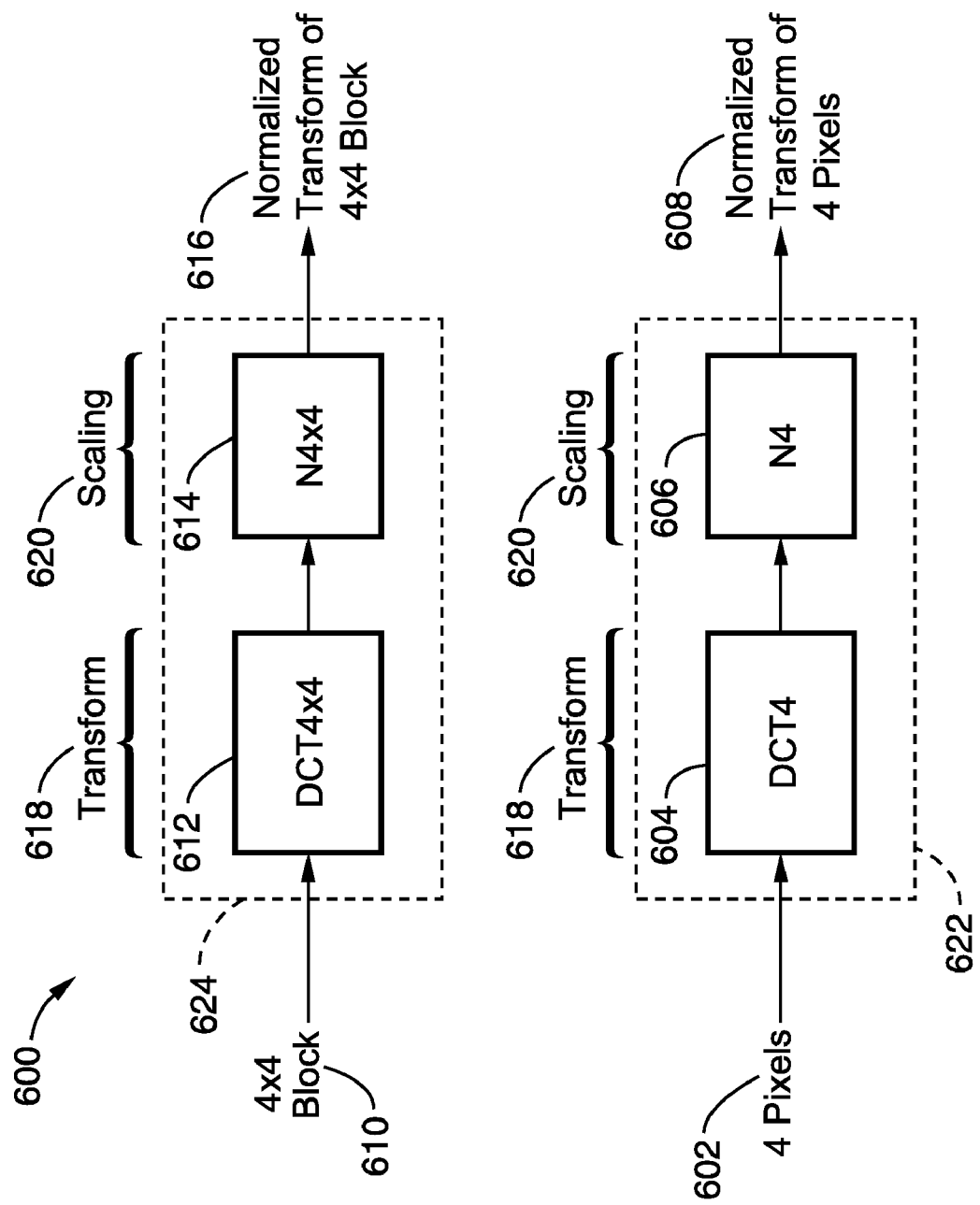
FIG. 6 is a flow chart of a 4 pixel normalization transform, and a 4×4 block normalized transform, both with scaling.

Normalized transforms are used in the histogram estimation steps described above in FIGS. 3-5. In FIG. 6 a flowchart of a normalized transform is shown as a transform with uniform scaling so that each transform coefficient has the same amplification.

Normalized Transformation of a Vector

Refer now to FIG. 6, which is a flow chart of the transformations 600 of both a 4 pixel vector and a 4×4 block of pixels. The normalized transform is defined mathematically in the following manner. Let $\vec{s}=[s_0,s_1,s_2,s_3]^T$ be a 4 elements vector 602 (here labeled as 4 Pixels). The normalized transform NDCT of $\vec{s}$ is defined as $$S=[S_0,S_1,S_2,S_3]^T=NDCT_4(s)$$

In particular, the normalized transform $NDCT_4$ (s) is computed by the following steps:

Step 1, compute DCT of $\vec{s}$ 602 as $$\vec{S}'=[S_0',S_1',S_2',S_3']^T=[H]\vec{s} \text{ at 604 where}$$

$$H = \begin{bmatrix} 1 & 1 & 1 & 1 \\ 2 & 1 & -1 & 2 \\ 1 & -1 & -1 & 1 \\ 1 & -2 & 2 & -1 \end{bmatrix}$$

where is referred to as the DCT4.

Step 2, normalize the coefficients at 606:

$$S_i = \begin{cases} 4S' & i \in \{0, 2\} \\ 4 \times (41449 \times S_i')/2^{16} & i \in \{1, 3\} \end{cases},$$

which may also be referred to as the N4 function 606, as shown in FIG. 6. The output of the 4 pixel 602 normalized transform is 608.

Normalized Transformation of a 4×4 Block

Let [y] be a 4×4 input block 610 such that $$[y] = \begin{bmatrix} y_{0,0} & y_{0,1} & y_{0,2} & y_{0,3} \\ y_{1,0} & & & \\ y_{2,0} & & \ddots & \\ y_{3,0} & & & y_{3,3} \end{bmatrix}.$$

The normalized transform $NDCT_{4\times4}([y])$ is defined as $$[Y] = \begin{bmatrix} Y_{0,0} & Y_{0,1} & Y_{0,2} & Y_{0,3} \\ Y_{1,0} & & & \\ Y_{2,0} & & \ddots & \\ Y_{3,0} & & & Y_{3,3} \end{bmatrix} = NDCT_{4\times4}([y])$$

The normalized transform $NDCT_{4\times4}([y])$ is computed by the following steps:

Step 1, compute DCT of [y] as $$[Y'] = \begin{bmatrix} Y'_{0,0} & Y'_{0,1} & Y'_{0,2} & Y'_{0,3} \\ Y'_{1,0} & & & \\ Y'_{2,0} & & \ddots & \\ Y'_{3,0} & & & Y'_{3,3} \end{bmatrix} = [H][y][H]^T \text{ at } 612$$

Step 2, normalize the coefficients at step N4×4 614 to produce a normalized transform 616 of the input 4×4 block 610:

$$Y_{i,j} = \begin{cases} Y'_{i,j} & (i,j) \in \{(0,0),(0,2),(2,0),(2,2)\} \\ (26214 \times Y'_{i,j})/2^{16} & (i,j) \in \{(1,1),(1,3),(3,1),(3,3)\} \\ (41449 \times Y'_{i,j})/2^{16} & \text{otherwise} \end{cases}$$

To restate the previous process, in FIG. 6, there are two major steps for the input 4 pixel 602 and 4×4 block input 610: first a transform step 618, then a scaling, or normalizing step 620.

In FIG. 6, the steps of performing a DCT and normalizing were described.

Figure 7B:
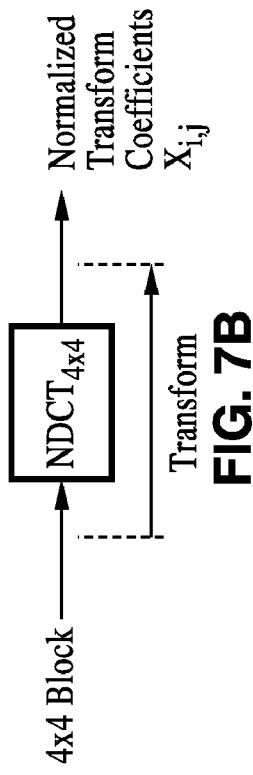
FIG. 7B is a flow chart of a normalized NDCT transform of a 4×4 block of pixels.
Figure 7A:
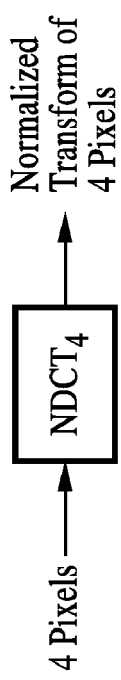
FIG. 7A is a flow chart of an NDCT transform of a set of 4 pixels into an normalized NDCT transform of the 4 pixels.

Refer now to FIG. 7A, which is a flow chart of a normalized $NDCT_4$ transform of an input 4 pixel group into a normalized transform of the 4 pixel group.

Similarly, refer now to FIG. 7B, which takes as input a 4×4 block [y] of pixels to transform them through the $NDCT_{4\times4}$ transform, ultimately outputting the normalized transform coefficients $X_{i,j} = NDCT_{4\times4}([y])$. The $X_{i,j}$ will be described further later.

Process Overview

Figure 8:
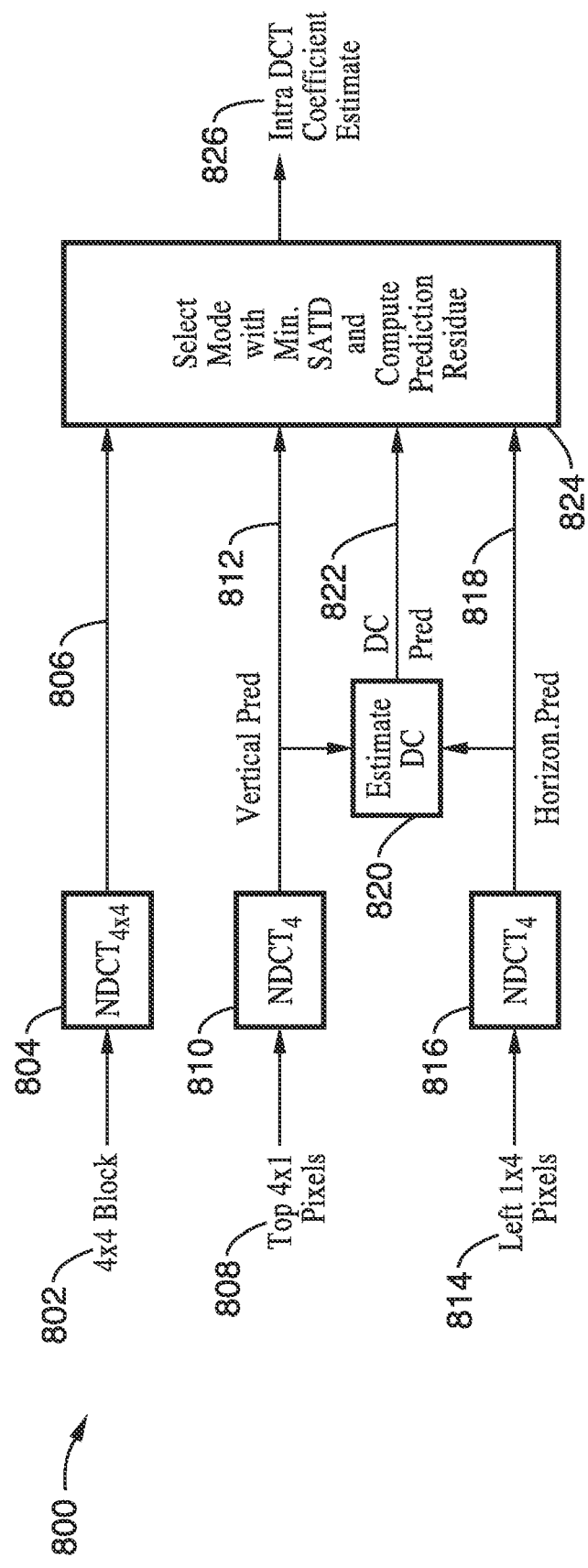
FIG. 8 is a flow chart of an improved intra mode selection method.

Refer now to FIG. 8 that describes an overview of a method of determining a set of optimal intra normalized DCT coefficients 800. Here, an input 4×4 block of pixels 802 is used as an input to the 4×4 normalized DCT 804 to produce the 4×4 DCT output 806. This output 806 will be used subsequently as described below.

The top 4×1 pixels 808 (the 4 top elements immediately above the input 4×4 block of pixels 802) are used as input into a $NDCT_4$ normalized DCT 810 to produce a vertical prediction DCT output 812.

Similarly, the left 1×4 pixels 814 (the 4 left elements immediately left of the input 4×4 block of pixels 802) are used as input into a $NDCT_4$ normalized DCT transform 816 to produce a horizontal prediction DCT output 818.

$NDCT_4$ normalized DCT vertical 812 and horizontal 818 predictions are used to estimate the steady state, or DC prediction 822.

The following inputs are compared 824 to determine the optimal intra mode prediction 826: 1) the 4×4 normalized DCT block transform output 806; 2) the vertical prediction normalized DCT output 812; 3) the horizontal prediction normalized DCT output 818; and 4) the DC prediction 822.

Only horizontal 818, vertical 812, and DC 822 predictions are used in the intra DCT mode decision coefficients. The intra predictions are performed in the frequency domain.

Estimate the Intra Macroblock DCT Coefficients

To reduce computation, only horizontal, vertical, and DC predictions are used in the estimation of the intra DCT coefficients. In particular, the intra predictions are computed in frequency domain; the DC prediction is derived from the horizontal and vertical predictions. And, finally, the prediction residue with the minimal SATD is selected as the output of the intra mode selection process.

Refer now to FIGS. 9A and 9B, which taken together describe the relationship 900 between the spatial and frequency domain intra predictor for horizontal and vertical modes. Here, an initial spatial domain representation (in FIG. 9A) of a 4×4 block of pixels 902 is shown as [x] with spatial elements $x_{i,j}$, where $i,j \in (0,1,2,3)$. The frequency domain representation (in FIG. 9B) of the 4×4 transformation 904 is shown as the transformed matrix [X], with elements $X_{i,j}$, where $i,j \in (0,1,2,3)$.

For convenience, the left 4×1 column vector with elements $(x_{0,-1}, x_{1,-1}, x_{2,-1}, x_{3,-1})^T$ is denoted as $\vec{h} = (h_0, h_1, h_2, h_3)^T$ 906. The normalized transform of $\vec{h}$ [x] contains elements $\vec{h} = (h_0, h_1, h_2, h_3)^T$, which are denoted as the left transform coefficients $\vec{H} = (H_0, H_1, H_2, H_3)^T$ 908.

Similarly, the top 1×4 row vector above 4×4 block [x] are $(x_{-1,0}, x_{-1,1}, x_{-1,2}, x_{-1,3})$, which are for convenience denoted 910 as $\vec{v} = (v_0, v_1, v_2, v_3)$. The normalized transform coefficients of $\vec{v}$ in the frequency domain [X] are 912 (also denoted as the top transform coefficients) denoted as $\vec{V} = (V_0, V_1, V_2, V_3)^T$, which correspond to elements $(X_{0,0}, X_{0,1}, X_{0,2}, X_{0,3})$ in the 4×4 transform coefficient matrix 904.

Compute Frequency Domain Predictors for the Intra Vertical Horizontal and DC Prediction Modes This process may be followed more readily by referring to FIG. 10, which details a flowchart 1000 for the computation of the frequency domain predictors for the intra vertical, horizontal, and steady state (or DC) modes.

First, input scalar index positions ($H_{pos}, V_{pos}$) of the top left pixels of a 4×4 pixel block [x] in a picture that begins with pixels 0,0 (the upper left corner of the picture in the H.264 design specification) and continues to pixel position values m, n. Also input the pixel block [x] 1002.

Next, from the 4 pixels immediately to the left and above the 4×4 pixel block [x] denote 1004 $\vec{h} = (h_0, h_1, h_2, h_3)^T$ when $H_{pos} \neq 0$, and $\vec{v} = (v_0, v_1, v_2, v_3)$ when $V_{pos} \neq 0$.

At this point, now calculate the horizontal predictor $\vec{H} = [H_0, H_1, H_2, H_3]^T$, the vertical predictor $\vec{V} = [V_0, V_1, V_2, V_3]^T$, and the steady state (DC) predictor D as follows:

If $H_{pos} \neq 0$ (1006) and $V_{pos} \neq 0$ (1008), then:

$\vec{H} = [NDCT_4] \vec{h}$ $\vec{V} = [NDCT_4] \vec{v}$ $D = (H_0 + V_0)/2$ at (1010).

If $H_{pos} = 0$ (e.g. not $H_{pos} \neq 0$ at 1006) and $V_{pos} \neq 0$ (at 1012), then:

$\vec{H} = [2^{15} - 1, 0, 0, 0]^T$ $\vec{V} = [NDCT_4] \vec{v}$ $D = V_0$ at (1014).

If $H_{pos} = 0$ (1006) and $V_{pos} = 0$ (e.g. not $V_{pos} \neq 0$ at 1008), then:

$\vec{H} = [NDCT_4] \vec{h}$ $\vec{V} = [2^{15} - 1, 0, 0, 0]^T$ $D = H_0$ at (1016).

If $H_{pos} = 0$ (e.g. not $H_{pos} \neq 0$ at 1006) and $V_{pos} = 0$ (e.g. not $V_{pos} \neq 0$ at 1012), then:

$\vec{H} = [2^{15} - 1, 0, 0, 0]^T$ $\vec{V} = [2^{15} - 1, 0, 0, 0]^T$ $D = 128 \times 16$ at (1018).

Here, it is assumed that the pixels can only take on 8 bits of information. In particular, the DC predictor $D = 128 \times 16$ appearing in block 1018 corresponds to the DC prediction for 8 bits per pixel. The predictor $\vec{H} = [2^{15} - 1, 0, 0, 0]^T$ in 1014, 1018, and the predictor $\vec{V} = [2^{15} - 1, 0, 0, 0]^T$ in 1016, 1018, are selected to make sure that they will have sufficiently large intra prediction cost for 8 bits per pixel, and consequently the corresponding prediction mode will not be selected as the minimal cost intra prediction mode in FIG. 11 below. This is consistent with the H.264/AVC standard.

Regardless of which calculation branch was taken from 1010, 1014, 1016, or 1018, next the cost is calculated 1020.

Compute Intra Prediction Cost

Refer now to FIG. 11, which predicts the computational costs of the various horizontal, vertical, or DC predictions 1100, and using these, outputs a selected intra mode with the least SATD. To this evaluation is first provided the $\vec{H}$, $\vec{V}$, D values determined above, as well as the input 4×4 pixel block [x] 1102.

Next, the values of $X_{i,j}$ are determined 1104 for i, j ∈ 0, 1, 2, 3 using the relationship $$\begin{bmatrix} X_{0,0} & X_{0,1} & X_{0,2} & X_{0,3} \\ X_{1,0} & X_{1,1} & X_{1,2} & X_{1,3} \\ X_{2,0} & X_{2,1} & X_{2,2} & X_{2,3} \\ X_{3,0} & X_{3,1} & X_{3,2} & X_{3,3} \end{bmatrix} = [NDCT_{4 \times 4}]([x]).$$

Cost precursors are then 1106 formed $$C_{hs} = \sum_{i=1}^{3} |X_{i,0}|$$

and $$C_{vs} = \sum_{j=1}^{3} |X_{0,j}|.$$

Finally, the costs are calculated 1108, where the cost of the horizontal prediction is $$C_H = \sum_{i=0}^{3} |H_i - X_{i,0}| + C_{vs},$$

the cost of the vertical prediction is $$C_V = \sum_{j=0}^{3} |V_j - X_{0,j}| + C_{hs},$$

and the cost of the DC prediction is $C_D = |D - X_{0,0}| + C_{hs} + C_{vs}$.

Once the predicted costs are determined, the appropriate intra mode is selected from the group of Horizontal Prediction, Vertical Prediction, and DC Prediction.

Select Intra Mode and Compute Prediction Residue

The intra mode with the minimal cost is selected as the intra prediction mode and the corresponding DCT coefficients are replaced by the prediction error to obtain the prediction residue. In particular:

If $C_H \leq C_V$ and $C_H \leq C_D$, then select Horizontal Prediction 1110 and replace the vertical frequency components $X_{i,0}$ of X by $(X_{i,0} - H_i)$ for i = 0, 1, 2, 3;

If $C_H \leq C_V$ and $C_H > C_D$, select DC Prediction 1112 and replace the DC component $X_{0,0}$ of X by $(X_{0,0} - D)$;

If $C_H > C_V$ and $C_V \leq C_D$, select Vertical Prediction 1114 and replace the horizontal frequency components $X_{0,j}$ of X by $(X_{0,j} - V_j)$ for j = 0, 1, 2, 3; and finally;

If $C_H > C_V$ and $C_V > C_D$, select DC Prediction 1116 and replace the DC component $X_{0,0}$ of X by $(X_{0,0} - D)$.

The prediction residue associated with the minimal cost prediction selected among $C_H$, $C_V$, and $C_D$ is then output as the appropriate associated predicted residue. From this point, the selected intra prediction residue is used within the advanced video coder to compress the 4×4 block.

Estimation of Forward Predicted DCT Coefficients

Refer now to FIG. 12, the method for obtaining 1200 the forward predicted DCT coefficients is as follows.

First, compute the forward prediction using the forward motion vector (MV) 1202 from FME and forward reference picture 1204 in a motion compensation 1206.

Then, compute the forward prediction residue 1208 by subtracting the output from the motion compensation 1206 from the current macroblock 1210.

Finally, apply the normalized DCT transform 1212 to the prediction residue to obtain the forward predicted DCT coefficients 1214.

Estimation of Backward Predicted DCT Coefficients

As shown in FIG. 13, the method for obtaining 1300 the backward predicted DCT coefficients is as follows. This method is similar to the method used in the forward predicted DCT coefficient calculation.

First, compute the backward prediction by forming the backward motion vector (MV) 1302 from the associated forward motion vector (MV) field. Then compute the backward prediction using the backward motion vector (MV) 1302 from FME and backward reference picture 1304 in a motion compensation 1306.

Then, compute the backward prediction residue 1308 by subtracting the output from the motion comparison 1306 from the current macroblock 1310.

Finally, apply the normalized DCT transform 1312 to the prediction residue to obtain the backward predicted DCT coefficients 1314.

Estimation of the Backward Motion Field from the Forward Motion Field

Refer now to FIG. 14, which depicts the relationship between forward and backward motion vectors of a specific macroblock 1400. Here, the backward motion vector 1402 of a macroblock in picture n 1406 relative to picture n+d 1404 is derived from the forward motion vectors of picture n+d 1404 to picture n 1406 where d=2 for field picture, and d=1 for frame picture. The backward motion vector 1402 is derived in the following manner.

Initially, all the backward motion vectors of all macroblocks 1408 in picture n 1406 are marked to be invalid. Then for each macroblock at (x,y) 1414 in picture n+d 1404 the forward integer pixel motion vector (mvx,mvy) 1412 is mapped to the macroblock at $(\tilde{x},\tilde{y})$ 1410 in frame n 1406 by $$\tilde{x}=((x+mvx+8)//16)\times16$$

$$\tilde{y}=((y+mvy+8)//16)\times16$$

where // is an integer divide.

If the macroblock address $(\tilde{x},\tilde{y})$ 1410 is not outside the boundaries of the n 1406 the motion vector (−mvx,−mvy) is assigned as the backward motion vector 1402 of the macroblock at $(\tilde{x},\tilde{y})$ 1410 and the status of the backward motion vector is marked as valid.

Since some backward motion vectors cannot be estimated from the forward motion vector in the above manner, only valid backward motion vectors 1402 are used for backward motion compensation and motion mode decision.

Estimation of Bi-Directionally Predicted DCT Coefficients

Refer now to FIG. 15, which is a flow chart 1500 showing how the bi-directionally predicted DCT coefficients are the average of the forward and the backward predicted DCT coefficients.

Here, $X_f(i,j)$ 1502, $X_b(i,j)$ 1504, and $X_{bi}(i,j)$ 1506, $0 \le i, j \le 3$, are respectively the forward 1502, backward 1504, and bi-directionally motion compensated DCT 1506 coefficients. When the backward motion vector is valid 1508, the bi-directionally motion compensated DCT coefficients are computed by $$X_{bi}(i,j)=(X_f(i,j)+X_b(i,j)+1)>>1.$$

When the backward motion vector is not valid, there are no bi-directionally predicted DCT coefficients, therefore the forward predicted DCT coefficients 1502 are selected by default in the motion mode decision 318, as shown in FIG. 3.

Motion Mode Decision

As previously shown in FIG. 3, motion mode decisions are performed for the estimation of the B picture histograms. The motion mode decision 318 makes a selection among the forward 304, the backward 306, and the bi-directionally predicted DCT coefficient 314 for further processing. In particular, the motion type with the minimum sum of absolute value on the 16 blocks of 4×4 luminance transform coefficients in a macroblock is selected.

Intra/Non-Intra Decision

As shown in FIGS. 3 and 4, intra/non-intra decisions with SATD 320, are performed for the estimation of the B and P picture histograms. The mode decision makes a selection among the intra predicted and motion predicted DCT coefficients for further processing. In particular, the macroblock with the minimum sum of absolute transformed values of the 16 blocks of 4×4 luminance transform coefficients is selected to estimate the histograms.

Accumulation of Histogram

As shown in FIGS. 3, 4, and 5, there are a total of ten histograms of DCT coefficients. Each histogram, for b bits per luma sample, is accumulated in an integer array P of size $(2^b-1) \times 16 \times 5+1$ (i.e. 255×16×5+1 for 8 bits/sample). The array P is initialized to zero at the beginning of a picture. Then for each 4×4 transform coefficient block in a macroblock associated with the histogram P, $$P[|X_{i,j}|] \leftarrow P[|X_{i,j}|]+1, \text{ for } 0 \le i,j \le 3.$$

Estimation of Rate-QP Relationship

In general, for each input picture to the FME (206 of FIG. 2), three Rate-QP estimates, $R_I(QP)$, $R_P(QP)$, $R_B(QP)$, for all QP=0, ..., 51, may be obtained, assuming that the input picture would be coded as an I, P, or B picture.

For an I picture estimate, the intra luma (Y) histogram 504 and intra chroma (C) histogram 506 (from FIG. 5) are collected and processed according to the flow chart 1600 in FIG. 16. Here, intra luma (Y) histogram 504 and an Intra signal 1602 are input into a luma estimator for Rate-QP 1604 to output $\tilde{R}_{IY}(QP)$ for all QP. Similarly, the intra chroma (C) histogram 506 and an Intra signal 1606 are input into a chroma estimator for Rate-QP 1608 to output $\tilde{R}_{IC}(QP)$ for all QP. The output from the chroma estimator for Rate-QP 1608 is then processed by QP Offset 1610 to output $\tilde{R}_{IC}(QP+QP_{offset})$ for all QP. The outputs from the QP Offset 1610 and the luma estimator for Rate-QP 1604 are added 1612 to output $\tilde{R}_{IY}(QP)+\tilde{R}_{IC}(QP+QP_{offset})$ for all QP and used as inputs into the bit rate correction section, starting with the Medium Bit Rate Correction block 1614.

At the Medium Bit Rate Correction block 1614, additional information is used as inputs relating to the Picture Type and Size, and whether Context Adaptive Variable-Length Coding (CAVLC) is being used. The output is passed through the high bit rate correction block 1616 if the picture was found to be of a high bit rate at small QP, otherwise it is bypassed 1618 to the low bit rate correction block 1620 if it is not of a low bit rate at large QP, otherwise it also would be bypassed 1622 to yield the rate $R_I(QP)$ relationship of an I picture.

Refer now to FIG. 17 for a flowchart 1700 of the rate estimation for P or B pictures. Here intra luma histograms, intra chroma histograms, non-intra luma histograms, and non-intra chroma histograms (respectively 328, 330, 332, and 334 for B pictures, or respectively 406, 408, 410, and 412 for P pictures) are collected from FIG. 3 for B pictures or FIG. 4 for P pictures. These four input histograms (respectively renumbered here for convenience as 1702, 1704, 1706, and 1708) are then input with their respective intra or non-intra quantizations (1710, 1712, 1714, and 1716) to FIG. 17 to estimate the R(QP) for all QP of a P/B picture proceeding through similar estimations of R(QP) blocks 1718 with or without QP Offsets 1720, then through bit rate corrections 1722 to produce either a $R_P(QP)$ or a $R_B(QP)$ 1724 depending on whether a P or B picture is respectively being processed.

Refer back now to FIG. 16. The I, P, B picture Rate-QP estimates are obtained in similar manners. Particularly, the Rate-QP estimate of an I picture is obtained as shown in the flowchart 1600 of FIG. 16. First, an initial luma R(QP) estimate 1604 is obtained from the intra luma histogram 504, and an initial chroma R(QP) estimate 1608 is obtained from the intra chroma histogram 506. Since the AVC supports chroma offset on the quantization parameter, the initial chroma R(QP) estimate is offset 1610 and added 1612 to the initial luma R(QP) estimate 1604 to form the initial R(QP) estimate of the I picture prior to bit rate correction.

After the I picture initial R(QP) estimate 1612 is obtained, a medium bit rate correction 1614 is applied to the estimate, followed by a high bit rate correction 1616 when conditions are met, and then finally a low bit rate correction 1620 to improve the accuracy of the bit estimation in needed.

As shown in both FIGS. 16 and 17, I picture R(QP) estimation and the P/B picture R(QP) estimation have the same building blocks. The building blocks are:

(1) Initial estimation of the R(QP) from a histogram;

(2) Offset of the chroma R(QP) relationship to compensate for QP differences between the chroma and luma quantizers;

(3) Correction to the medium bit rate estimation based on picture type, size, and the type of entropy encoder;

(4) Correction of the high bit rate estimation as needed; and (5) Correction to the low bit rate estimation for I pictures when conditions are met.

Refer now to FIG. 18, where a graphical interpretation of the bit rate correction process is shown in a graph of R(QP) versus QP 1800. In this interpretation, three different bit rate estimation models are used. A medium bit rate model is used for $QP_1 \leq QP \leq QP_2$ 1802. When conditions are met, a linear high bit rate model is used for $0 \leq QP < QP_1$ 1804. Finally, for the intra coded pictures 1806, when conditions are met, a low bit rate model is used for $QP_2 \leq QP \leq 51$.

The method of determining the values of $QP_1$ and $QP_2$ will be shown below.

Initial Estimation of the Rate-QP Relationship

Refer now to FIG. 19, which is a flow chart 1900 showing how the initial Rate-QP $\tilde{R}(QP)$ estimate 1902 is derived from an input histogram 1904. First, M(QP), the number of non-zero coefficients quantized with parameter QP 1906, is estimated. Then the initial bit estimate $\tilde{R}(QP)$ is derived as $\tilde{R}(QP)=5.5 \times M(QP)$ 1908. $\tilde{R}(QP)$ 1902 provides an initial rough estimate of the bit rate as a function of the quantization parameter QP.

Estimation of the Number of Non-Zero Coefficients

Refer now to FIG. 20, which is a flowchart 2000 that shows how the number of non-zero DCT coefficients M(QP) 2002 as a function of QP are estimated from the histogram of the DCT coefficients 2004 with the following steps:

(1) For amplitude 0 to $k_{max}$, the largest possible value of the DCT coefficients (note that in general, for b bits per pixel, an upper bound of the DCT coefficients is $2^b \times 16 \times 5$, and that for 8 bits/pixel, an upper bound is $2^8 \times 16 \times 5 = 256 \times 16 \times 5$), obtain the number of coefficients $M_k$ with amplitude greater than or equal to k 2006 by $$M_k = \sum_{i=k}^{k_{max}} P[i]$$

where P is the histogram and P[i] is the frequency of the coefficients with amplitude i;

(2) Compute the minimum value of the quantization parameter $QP_k$ which would quantize the value k to one. As shown below, for an intra quantizer 2008, $$QP_k = 6\log_2\left(\frac{3k}{5}\right),$$

and for a non-intra quantizer 2010, $$QP_k = 6\log_2\left(\frac{12k}{25}\right)$$

For example, an approximated condition for a quantized coefficient to be non-zero can be determined as follows:

Let Q be the quantization parameter of an advanced video encoder. Then define $Q_M \equiv Q \mod 6$ and $Q_E \equiv Q//6$ where // denotes integer divide.

The advanced video encoder quantizer is defined as $$|X_q(i,j)|=[(|X(i,j)|A(Q_M,i,j)+f \cdot 2^{15+Q_E}) >> (15+Q_E)]$$

where f=1/3 for an intra slice and f=1/6 for a non-intra slice.

Therefore, $|X_q(i,j)|>0$ if and only if $$|X(i,j)|A(Q_M,i,j)+f \cdot 2^{15+Q_E} \geq 2^{15+Q_E},$$

which is equivalent to $$\frac{|X(i,j)|A(Q_M,i,j)}{2^{15+Q_E}} \geq (1-f).$$

The condition above may be simplified by observing the fact that the quantization table can be defined as $A(Q_M,i,j)=W(Q_M,r)$, where r=0 for $(i,j) \in \{(0,0),(0,2),(2,0),(2,2)\}$, r=2 for $(i,j) \in \{(1,1),(1,3),(3,1),(3,3)\}$, and r=2 otherwise, with $p=2^{1/6}$, $A_o=13107$, and $$W = \begin{bmatrix} 13107 & 5243 & 8066 \\ 11916 & 4660 & 7490 \\ 10082 & 4194 & 6554 \\ 9362 & 3647 & 5825 \\ 8192 & 3355 & 5243 \\ 7282 & 2893 & 4559 \end{bmatrix}$$

$$\simeq A_o \times \begin{bmatrix} 1/p^0 & 1/p^0 & 1/p^0 \\ 1/p^1 & 1/p^1 & 1/p^1 \\ 1/p^2 & 1/p^2 & 1/p^2 \\ 1/p^3 & 1/p^3 & 1/p^3 \\ 1/p^4 & 1/p^4 & 1/p^4 \\ 1/p^5 & 1/p^5 & 1/p^5 \end{bmatrix} \begin{bmatrix} 1 & 0 & 0 \\ 0 & 4/10 & 0 \\ 0 & 0 & 2/\sqrt{10} \end{bmatrix}.$$

Therefore, $$A(Q_M,i,j) \simeq \frac{N(r)A_o}{2^{Q_M/6}}$$

where $N(0)=1$, $N(1)=4/10$, $N(2)=2/\sqrt{10}$. In particular, the constant N(r) can be interpreted as the scaling factor that normalizes the integer DCT in H.264.

The condition $|X_q(i,j)|>0$ if and only if $$\frac{|X(i,j)|A(Q_M,i,j)}{2^{15+Q_E}} \geq (1-f)$$

approximately becomes and $$\frac{|X(i,j)|N(r)A_o}{2^{15+Q_E} \cdot 2^{Q_M/6}} \geq (1-f)$$

and $$\frac{|X(i,j)|N(r)}{2^{Q/6}}\left(\frac{A_o}{2^{15}}\right) \geq (1-f)$$

since $Q=(6Q_E+Q_M)$.

Consequently, $|X_q(i,j)|>0$, when approximately $$6\log_2\left(\frac{|X(i,j)|N(r)}{2.5\times(1-f)}\right) \geq Q$$

where $2^{15}/A_0 \cong 2.5$ and $f=1/3$ for intra slice and $f=1/6$ for non-intra slice.

If the DCT coefficients are normalized such that $$\overline{X}(i,j)=X(i,j)N(r),$$

and a quantizer with $f=1/3$ is used, then $|X_q(i,j)|>0$, when approximately $6\log_2(0.6|\overline{X}(i,j)|) \geq Q$.

(3) The function M(QP) 2002 is then constructed by linear interpretation of the points $(M_k,Q_k)$ and re-sampled at QP=0, . . . , 51 2012.

Medium Bit Rate Correction

Experimentally, it has been found that the initial Rate-QP estimate for bitrate between an upper bound of bit per pixel, bpp_upper, and a lower bound of bit per pixel, bbp_lower, can be improved. In particular, a better estimate is $$\overline{R}(QP)=a\cdot\tilde{R}(QP)+b[1-e^{-d\cdot QP}]$$

for QP=0, . . . , 51. The correction parameters a, b, d are listed in Table 3 for standard definition (SD) sequences, Table 4 for HD progressive sequences, and Table 5 for high definition (HD) interlace sequences. Their values depend on the picture size, picture structure, picture type, and the type of the entropy encoder.

High Bit Rate Correction

Experimentally, it has also been found that at high bit rate, the bit estimates can be improved under some conditions. Let $QP_1$ be the smallest value such that $$\overline{R}(QP_1) \leq bpp\_upper \times pels/\text{picture}.$$

When $\overline{R}(0) \geq bpp\_upper \times pels/\text{picture}$, $QP_1$ exists, this may be approximated by $$\overline{R}(QP_1) \approx bpp\_upper \times pels/\text{picture}.$$

The values of bpp_upper are listed in Tables 3-5.

When $QP_1$ exists, a better estimate is obtained by first estimating $R_0$ for the rate at QP=0 and then fitting a straight line between $(0,R_0)$ and $(QP_1,\overline{R}(QP_1))$ with $$R(QP) = (R_0 - \overline{R}(QP_1))\frac{QP_1 - QP}{QP_1 - 0} + \overline{R}(QP_1)$$

for $0 \leq QP \leq QP_1$ to linearly interpolate the QP values.

When $\overline{R}(0) < bpp\_upper \times pels/\text{picture}$, $QP_1$ does not exist, and the high bit rate correction is by-passed.

The bit estimate $R_0$ at QP=0 is estimated from the entropy $E_0$ at QP=0. It is defined as $$R_0 = \max[R(QP_1), E_0]$$

Refer now to FIG. 21 and FIG. 22, where flow charts are shown that calculate $E_0$, the entropy estimate of a picture at QP=0. For the I picture estimate in FIG. 21, it is the sum of the chroma and the luma entropy estimates. The chroma/luma entropy estimate is derived from its corresponding histogram. The formula for the calculation of $E_0$ (the entropy estimate at QP=0) will be detailed below.

Similarly, FIG. 22 shows that the entropy estimate of a P or B picture at QP=0 is the sum of the intra luma estimate, the intra chroma estimate, the non-intra luma estimate, and the non-intra chroma estimate. Each chroma/luma entropy estimate is derived from its corresponding histogram.

Estimation of the Entropy at QP=0 of a Given DCT Histogram

Refer now to FIG. 23, which is a flow chart 2300 showing that the entropy of a given DCT coefficient histogram at QP=0 2302 is estimated by the entropy of the DCT coefficients when quantized with QP=0 2304. Let $\tilde{E}_0$ 2302 be the rate at QP=0. It is estimated by the following steps:

(1) Estimate the distribution of the quantized coefficients from the histogram of the normalized DCT coefficients 2306; and then (2) Compute the entropy of the distribution of the quantized coefficients 2304 depending on the Intra/Non-Intra selection 2308.

Estimation of the Distribution of Quantized Coefficients

Let $P_0[k]$ be the distribution of the quantized coefficients when quantized with QP=0. It is estimated by quantizing the histogram P[k] of the DCT coefficients as follows:

(1) First, Initialize $P_0[k]=0$ for $k=0, \ldots, k_{max}$,
(2) Then, for each i, $i=0, \ldots, k_{max}$, $$k=int(i/2.5+1/r)$$

$$P_0[k] \leftarrow P_0[k]+P[i]$$

where r is the rounding parameter. For intra histograms, r=3. For non-intra histograms, r=6.

Estimation of the Entropy of the Quantized Coefficients

The entropy of the quantized coefficients with QP=0 is $$\tilde{E}_0 = (N - P_0[0]) + \left(N\log_2 N - \sum_{k=1}^{k_{max}} P_0[k]\log_2 P_0[k]\right)$$

where N is the total number of coefficients of the histogram.

Low Bit Rate Correction for Intra Picture

For intra picture bit estimation, the bit estimation at lower bit rates may be improved when certain conditions are met.

Let $QP_2=\max(QP_3,24)$ where $QP_3$ has the smallest value such that $\overline{R}(QP_3) \leq bpp\_lower \times pels/\text{picture}$, for $0 \leq QP_3 \leq 50$, or when $QP_3$ does not exists, set $QP_3=50$. The values of bpp_lower are listed in Tables 3-5.

Let M be the number of macroblocks in a picture and $R_{MIN}$ be the minimum number of bits per macroblock as show in Table 6. When $M \cdot R_{MIN} < \overline{R}(QP_2)$, a better estimate is obtained by first estimating $R_{51}$ of the rate at QP=51 and fit an logarithmic function between $(QP_2, \overline{R}(QP_2))$ and $(51, R_{51})$ such that $$R(QP) = \frac{\overline{R}(QP_2)}{2^{\frac{QP-QP_2}{51-QP_2} Log_2\left(\frac{R(QP_2)}{R_{51}}\right)}}$$

for $QP_2 \leq QP \leq 51$.

When $M \cdot R_{MIN} \geq \overline{R}(QP_2)$, low bit rate correction is not needed, and it is not applied.

Estimation of the Rate at QP=51

The rate at QP=51 is derived from a advanced bit estimation algorithm. It is defined as $$R_{51} = \max(M \cdot R_{min}, N \cdot (e\sigma + f))$$

$$\sigma^2 = \frac{1}{N} \sum_{k=1}^{k_{max}} k^2 P_Y[k] + \frac{1}{N_C} \sum_{k=1}^{k_{max}} k^2 P_C[k]$$

where M is the number of macroblocks in a picture, $N = N_Y + N_C$, and $N_Y, N_C$, is the number of luma and chroma transform coefficients in a picture. $R_{min}$ is the minimum bits per macroblock. The parameters $R_{min}$, e, and f for CAVLC and CABAC are shown in Table 6.

The standard deviation $\sigma$ is derived from the histogram of the luma and chroma transform coefficients in an I picture, where the luma histogram is $P_Y[k]$, and the chroma histogram is $P_C[k]$.

CONCLUSION

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

Field Picture Timing For Bit Estimation In FME With N Pictures In A Sequence

| | | | | | | | | | | | |
|---|---|---|---|---|---|---|---|---|---|---|---|
| FME Input Picture Num | 0 | 1 | 2 | 3 | 4 | 5 | 6 | 7 | ... ... | N − 2 | N − 1 |
| FME Ref Picture | 0 | 0 | 0 | 1 | 2 | 3 | 4 | 5 | | N − 4 | N − 3 |
| I/P Bit Estimation | 0 | 1 | | | | | | | | N − 2 | N − 1 |
| I/P Forward Ref Pic | | | 0 | | | | | | | N − 4 | N − 3 |
| I/P/B Bit estimation | | | | | 2 | 3 | 4 | 5 | ... ... | N − 4 | N − 3 |
| I/P/B Forward Ref Pic | | | | | 0 | 1 | 2 | 3 | ... ... | N − 5 | N − 4 |
| I/P/B Backward Ref Pic | | | | | 4 | 5 | 6 | 7 | ... ... | N − 2 | N − 1 |

TABLE 2

Frame Picture Timing Of Bit Estimation In FME With N Pictures In A Sequence

| | | | | | | | | | | | |
|---|---|---|---|---|---|---|---|---|---|---|---|
| FME Input Picture Num | 0 | 1 | 2 | 3 | 4 | 5 | 6 | 7 | ... ... | N − 2 | N − 1 |
| FME Ref Picture | 0 | 0 | 1 | 2 | 3 | 4 | 5 | 6 | | N − 3 | N − 2 |
| I/P Bit Estimation | 0 | | | | | | | | | | N − 1 |
| I/P Forward Ref Pic | | | | | | | | | | | N − 3 |
| I/P/B Bit estimation | | 1 | 2 | 3 | 4 | 5 | 6 | | ... ... | N − 3 | N − 2 |
| I/P/B Forward Ref Pic | | 0 | 1 | 2 | 3 | 4 | 5 | | ... ... | N − 4 | N − 3 |
| I/P/B Backward Ref Pic | | 2 | 3 | 4 | 5 | 6 | 7 | | ... ... | N − 2 | N − 1 |

TABLE 3

Correction Parameters For SD Sequences

| | Pic Type | a | b | d | bpp_lower | bpp_upper |
|---|---|---|---|---|---|---|
| CAVLC | I | 0.94 | 35000 | 5.0000E−05 | 0.4 | 2.8 |
| | P | 0.86 | 14000 | 6.6667E−05 | 0.4 | 2.8 |
| | B | 0.9 | 5700 | 0 | 0.2 | 2 |
| CABAC | I | 0.88 | 3500 | 5.0000E−05 | 0.4 | 2.8 |
| | P | 0.86 | 14000 | 6.6667E−05 | 0.4 | 2.8 |
| | B | 0.7 | 5700 | 0 | 0.2 | 2 |

TABLE 4

Correction Parameters For HD Progressive Sequences

| | Pic Type | a | b | d | bpp_lower | bpp_upper |
|---|---|---|---|---|---|---|
| CAVLC | I | 0.68 | 9.00E+05 | 3.3333E−06 | 0.4 | 2.8 |
| | P | 0.71 | 357000 | 1.0000E−05 | 0.4 | 2.8 |
| | B | 0.6 | 100000 | 2.0000E−06 | 0.2 | 2.0 |
| CABAC | I | 0.6 | 7.00E+05 | 2.2222E−06 | 0.3 | 2.8 |
| | P | 0.625 | 212500 | 6.6667E−06 | 0.3 | 2.8 |
| | B | 0.6 | 100000 | 2.0000E−06 | 0.2 | 2.0 |

TABLE 5

Correction Parameters For HD Interlace Sequences

| | Pic Type | a | b | d | bpp_lower | bpp_upper |
|---|---|---|---|---|---|---|
| CAVLC | I | 0.75 | 375000 | 1.0000E−05 | 0.4 | 2.8 |
| | P | 0.67 | 142487 | 1.0000E−05 | 0.4 | 2.8 |
| | B | 0.6 | 0 | 0 | 0.2 | 2.0 |
| CABAC | I | 0.678 | 287000 | 1.0000E−05 | 0.3 | 3.0 |
| | P | 0.6 | 80000 | 2.0000E−05 | 0.3 | 2.8 |
| | B | 0.6 | 100000 | 2.0000E−06 | 0.2 | 2.0 |

TABLE 6

Parameters For Bit Estimation At QP = 51

| | RMIN | e | f |
|---|---|---|---|
| CAVLC | 6.1 | 0.00180541 | 0.01534307 |
| CABAC | 0.4 | 0.00127655 | 0.00527216 |

What is claimed is:

1. A method of Rate-QP estimation for an I picture, comprising:
   (a) providing an input group of pictures (GOP);
   (b) selecting an input I picture within the input group of pictures; and
   (c) outputting, to a computer readable medium, a bit rate corrected Rate-QP, R(QP), for the input I picture, comprising:
   calculating an intra luma (Y) Rate-QP estimate from an intra luma (Y) histogram;
   calculating an intra chroma (C) Rate-QP estimate from an intra chroma (C) histogram;
   offsetting the intra chroma (C) Rate-QP estimate to form an offset intra chroma (C) estimate; and
   setting a Rate-QP for the input I picture to a sum of:
   (i) the intra luma (Y) Rate-QP estimate; and
   (ii) the offset intra chroma (C) Rate-QP estimate.

2. The method of claim 1, wherein the outputting the bit rate corrected Rate-QP step comprises correcting the Rate-QP of the input I picture to produce the bit rate corrected Rate-QP, R(QP).

3. The method of claim 2, wherein the correcting the bit rate corrected Rate-QP step comprises:
   (a) partitioning a set of ordered pairs of (QP, Rate-QP) into a plurality of correction regions; and
   (b) applying mapping functions for QP values in each of the correction regions to produce the bit rate corrected Rate-QP, R(QP).

4. The method of claim 3, wherein the plurality of correction regions comprise:
   (a) a high bit rate correction region;
   (b) a medium bit rate correction region; and
   (c) a low bit rate correction region.

5. The method of claim 4, further comprising applying a linear interpolation for QP values in the high bit rate correction region.

6. The method of claim 4, further comprising applying a medium bit rate correction for QP values in the medium bit rate correction region.

7. The method of claim 4, further comprising applying a low bit rate correction for QP values in the low bit rate correction region.

8. The method of claim 1, wherein the intra luma (Y) histogram, and the intra chroma (C) histogram are accumulated, for every macroblock in the group of pictures, in steps comprising:
   (a) forming an estimate of a set of intra prediction coefficients;
   (b) for each macroblock, separating the set of intra prediction coefficients into an output accumulated intra luma (Y) histogram and an accumulated intra chroma (C) histogram.

9. The method of claim 8, wherein the selecting the intra mode step comprises:
   (a) selecting the intra mode that has a lowest Sum of Absolute Transformed Differences (SATD) among intra modes using a set of inputs [x], $H_{pos}$, $V_{pos}$, $\vec{h}$, and $\vec{v}$;
   (b) wherein [x] is a 4×4 block of pixels within the input P picture and $$[x] \equiv \begin{bmatrix} x_{0,0} & x_{0,1} & x_{0,2} & x_{0,3} \\ x_{1,0} & x_{1,1} & x_{1,2} & x_{1,3} \\ x_{2,0} & x_{2,1} & x_{2,2} & x_{2,3} \\ x_{3,0} & x_{3,1} & x_{3,2} & x_{3,3} \end{bmatrix};$$

(c) wherein $H_{pos}$ is a horizontal pixel position of the 4×4 block within the image;
   (d) wherein $V_{pos}$ is a vertical pixel position of the 4×4 block within the image;
   (e) wherein $\vec{h}$ is a vector immediately left of the 4×4 block [x], defined as $\vec{h} \equiv (x_{0,-1}, x_{1,-1}, x_{2,-1}, x_{3,-1})^T$ relative to the indexing of the elements of [x];

(f) wherein $\vec{v}$ is a vector immediately above the 4×4 block [x], defined as $\vec{v} \equiv (x_{-1,0}, x_{-1,1}, x_{-1,2}, x_{-1,3})^T$ relative to the indexing of the elements of [x]; and (g) wherein the lowest SATD intra mode is determined among a group comprising:
  (i) a horizontal intra mode;
  (ii) a vertical intra mode; and
  (iii) a steady state (DC) intra mode.

10. The method of claim 9, wherein the selecting the lowest SATD intra mode step comprises:
   (a) calculating a horizontal predictor $\vec{H} \equiv (H_0, H_1, H_2, H_3)^T$, a vertical predictor $\vec{V} \equiv (V_0, V_1, V_2, V_3)^T$, and a steady state (DC) predictor D;
   (b) calculating a horizontal cost precursor $C_{hs}$ and a vertical cost precursor $C_{vs}$ using the horizontal predictor $\vec{H}$, the vertical predictor $\vec{V}$, and the steady state (DC) predictor D; and
   (c) calculating a horizontal intra mode cost $C_H$, a vertical intra mode cost $C_V$, and a steady state (DC) intra mode cost $C_D$ using the horizontal cost precursor $C_{hs}$ and the vertical cost precursor $C_{vs}$.

11. The method of claim 10, wherein the calculating of the horizontal predictor $\vec{H}$, the vertical predictor $\vec{V}$, and the steady state (DC) predictor D comprises:
   (a) when $H_{pos} \neq 0$ and $V_{pos} \neq 0$ then:
     (i) setting $\vec{H} = (H_0, H_1, H_2, H_3)^T = [NDCT_4]\vec{h}$
       where $\vec{h} \equiv (h_0, h_1, h_2, h_3)^T (x_{0,-1}, x_{1,-1}, x_{2,-1}, x_{3,-1})^T$;
     (ii) setting $\vec{V} \equiv (v_0, v_1, v_2, v_3)^T = [NDCT_4]\vec{v}$
       where $\vec{v} \equiv (v_0, v_1, v_2, v_3) \equiv (x_{-1,0}, x_{-1,1}, x_{-1,2}, x_{-1,3})^T$;
     (iii) setting $D = (H_0 + V_0)/2$;
   (b) when $H_{pos} = 0$ and $V_{pos} \neq 0$ then:
     (i) setting $\vec{H} = (2^{15} - 1, 0, 0, 0)^T$;
     (ii) setting $\vec{V} \equiv (V_0, V_1, V_2, V_3)^T = [NDCT_4]\vec{v}$
       where $\vec{v} \equiv (v_0, v_1, v_2, v_3) \equiv (x_{-1,0}, x_{-1,1}, x_{-1,2}, x_{-1,3})^T$;
     (iii) setting $D = V_0$;
   (c) when $H_{pos} \neq 0$ and $V_{pos} = 0$ then:
     (i) setting $\vec{H} \equiv (H_0, H_1, H_2, H_3)^T = [NDCT_4]\vec{h}$
       where $\vec{h} \equiv (h_0, h_1, h_2, h_3)^T \equiv (x_{0,-1}, x_{1,-1}, x_{2,-1}, x_{3,-1})^T$;
     (ii) setting $\vec{V} = (2^{15} - 1, 0, 0, 0)^T$;
     (iii) setting $D = H_0$; and
   (d) when $H_{pos} = 0$ and $V_{pos} = 0$ then:
     (i) setting $\vec{H} = (2^{15} - 1, 0, 0, 0)^T$;
     (ii) setting $\vec{V} = (2^{15} - 1, 0, 0, 0)^T$; and
     (iii) setting $D = 128 \times 16$.

12. The method of claim 10, wherein the calculating of the horizontal cost precursor $C_{hs}$ and the vertical cost precursor $C_{vs}$ comprises:
   (a) calculating the values $X_{i,0}, X_{0,i}$, for $i \in 0, 1, 2, 3$ using the relationships $$\begin{bmatrix} X_{0,0} & X_{0,1} & X_{0,2} & X_{0,3} \\ X_{1,0} & X_{1,1} & X_{1,2} & X_{1,3} \\ X_{2,0} & X_{2,1} & X_{2,2} & X_{2,3} \\ X_{3,0} & X_{3,1} & X_{3,2} & X_{3,3} \end{bmatrix} = [NCDT_{4 \times 4}]([x]);$$

(b) calculating the horizontal cost precursor $$C_{hs} = \sum_{i=1}^{3} |X_{i,0}|;$$

and
   (c) calculating the vertical cost precursor $$C_{vs} = \sum_{j=1}^{3} |X_{0,j}|.$$

13. The method of claim 12, wherein calculating the horizontal intra mode cost $C_H$ comprises calculating $$C_H = \sum_{i=0}^{3} |H_i - X_{i,0}| + C_{vs}.$$

14. The method of claim 12, wherein calculating the vertical intra mode cost $C_V$ comprises calculating $$C_v = \sum_{j=0}^{3} |V_j - X_{0,j}| + C_{hs}.$$

15. The method of claim 12, wherein calculating the steady state (DC) intra mode cost $C_D$ comprises calculating $C_D = |D - X_{0,0}| + C_{hs} + C_{vs}$.

16. The method of claim 10, further comprising selecting the lowest SATD intra mode with a lowest associated intra mode cost among the group consisting of: the horizontal intra mode cost $C_H$, the vertical intra mode cost $C_V$, and the steady state (DC) intra mode cost $C_D$.

17. A method of Rate-QP estimation for an I picture, comprising:
   (a) providing an input group of pictures (GOP);
   (b) selecting an input I picture within the input group of pictures; and
   (c) outputting, to a computer readable medium, a bit rate corrected Rate-QP, R(QP), for the input I picture by correcting the Rate-QP of the input I picture to produce the bit rate corrected Rate-QP, R(QP);
   (d) wherein correcting said Rate-QP comprises:
     (i) partitioning a set of ordered pairs of (QP, Rate-QP) into a plurality of correction regions; and
     (ii) applying mapping functions for QP values in each of the correction regions to produce the bit rate corrected Rate-QP, R(QP);
   (e) wherein said plurality of correction regions comprise a high bit rate correction region, a medium bit rate correction region, and a low bit rate correction region.

18. The method of claim 17, further comprising applying a linear interpolation for QP values in the high bit rate correction region.

19. The method of claim 17, further comprising applying a medium bit rate correction for QP values in the medium bit rate correction region.

20. The method of claim 17, further comprising applying a low bit rate correction for QP values in the low bit rate correction region.

21. A method of Rate-QP estimation for an I picture, comprising:
   (a) providing an input group of pictures (GOP);
   (b) selecting an input I picture within the input group of pictures; and
   (c) outputting, to a computer readable medium, a bit rate corrected Rate-QP, R(QP), for the input B picture by correcting the Rate-QP of the input B picture to produce the bit rate corrected Rate-QP, R(QP);
   (d) wherein correcting said Rate-QP comprises:
      (i) partitioning a set of ordered pairs of (QP, Rate-QP) into a plurality of correction regions; and
      (ii) applying mapping functions for QP values in each of the correction regions to produce the bit rate corrected Rate-QP, R(QP);
   (e) wherein said correction regions comprise a low, medium, and high bit rate correction regions; and
   (f) applying a linear interpolation for QP values in the high bit rate correction region.

22. The method of claim 21, further comprising:
applying a medium bit rate correction for QP values in the medium bit rate correction region; and
applying a low bit rate correction for QP values in the low bit rate correction region.

* * * * *